:

US011159374B2

(12) United States Patent
Thomasson et al.

(10) Patent No.: US 11,159,374 B2
(45) Date of Patent: *Oct. 26, 2021

(54) NETWORKING VISUALIZATIONS THAT UPDATE DATA MODEL AND DEPLOY SERVER NODES

(71) Applicant: Red Hat, Inc., Raleigh, NC (US)

(72) Inventors: Benjamin Thomasson, Durham, NC (US); Peter Sprygada, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,845

(22) Filed: May 28, 2020

(65) Prior Publication Data

US 2020/0295987 A1    Sep. 17, 2020

Related U.S. Application Data

(63) Continuation of application No. 15/908,131, filed on Feb. 28, 2018, now Pat. No. 10,680,891.

(51) Int. Cl.
*H04L 12/24* (2006.01)
(52) U.S. Cl.
CPC ........ *H04L 41/082* (2013.01); *H04L 41/0806* (2013.01); *H04L 41/0879* (2013.01); *H04L 41/12* (2013.01); *H04L 41/22* (2013.01)
(58) Field of Classification Search
CPC ... H04L 41/082; H04L 41/12; H04L 41/0803; H04L 41/0806; H04L 41/0816;
(Continued)

(56) References Cited

U.S. PATENT DOCUMENTS 6,678,241 B1 * 1/2004 Gai ................... H04L 12/462
                                                              370/216
6,760,306 B1 * 7/2004 Pan ...................... H04L 47/15
                                                              370/230
(Continued)

FOREIGN PATENT DOCUMENTS

CN            107426335        12/2017

OTHER PUBLICATIONS

Justice, Daniel, "Configuration Automation Using Python and Ansible (Part 1)," Jun. 20, 2016.

*Primary Examiner* — Ruolei Zong
(74) *Attorney, Agent, or Firm* — Lowenstein Sandler LLP

(57) ABSTRACT

Systems and methods for generating a visual display of a topology of servers, user input may be received for updating configurations of impacted servers. An example method may include providing, by a processing device, a graphical user interface comprising a plurality of nodes associated with a network; receiving, via the graphical user interface, user input requesting a change to at least one of the plurality of nodes or to the network; determining one or more impacted nodes of the plurality of nodes impacted by the change; generating a physical change instruction and a configuration instruction for the one or more impacted nodes, wherein the physical change instruction represents a change to physical connectivity of one of the one or more impacted nodes and the configuration instruction represents a change of a configuration value of one of the one or more impacted nodes; and upon determining that the physical change instruction has been implemented on the one or more impacted nodes, initiating, by the processing device, the configuration instruction to change the configuration value.

20 Claims, 14 Drawing Sheets

(58) Field of Classification Search
CPC ..... H04L 41/0813; H04L 41/22; H04L 41/08; H04L 41/0879; H04L 45/02
USPC ........................................................ 709/220
See application file for complete search history.

(56) References Cited

U.S. PATENT DOCUMENTS

| | | | |
|---|---|---|---|
| 9,331,910 B2 | 5/2016 | Dutt et al. | |
| 9,730,078 B2 | 8/2017 | Nixon et al. | |
| 10,057,131 B1* | 8/2018 | Brown | H04L 41/0853 |
| 2002/0052941 A1 | 5/2002 | Patterson | |
| 2003/0140132 A1* | 7/2003 | Champagne | H04L 41/0856 |
| | | | 709/223 |
| 2005/0201299 A1* | 9/2005 | Radi | H04L 67/1095 |
| | | | 370/254 |
| 2007/0097883 A1* | 5/2007 | Liu | H04L 41/22 |
| | | | 370/254 |
| 2009/0232029 A1* | 9/2009 | Abu-Hamdeh | H04L 41/0803 |
| | | | 370/255 |
| 2011/0092182 A1* | 4/2011 | Hilden | H04M 11/04 |
| | | | 455/404.2 |
| 2011/0096714 A1* | 4/2011 | French | H04L 41/0846 |
| | | | 370/315 |
| 2012/0089707 A1* | 4/2012 | Baba | H04L 41/0806 |
| | | | 709/220 |
| 2017/0195187 A1* | 7/2017 | Bennett | H04L 41/0866 |

\* cited by examiner

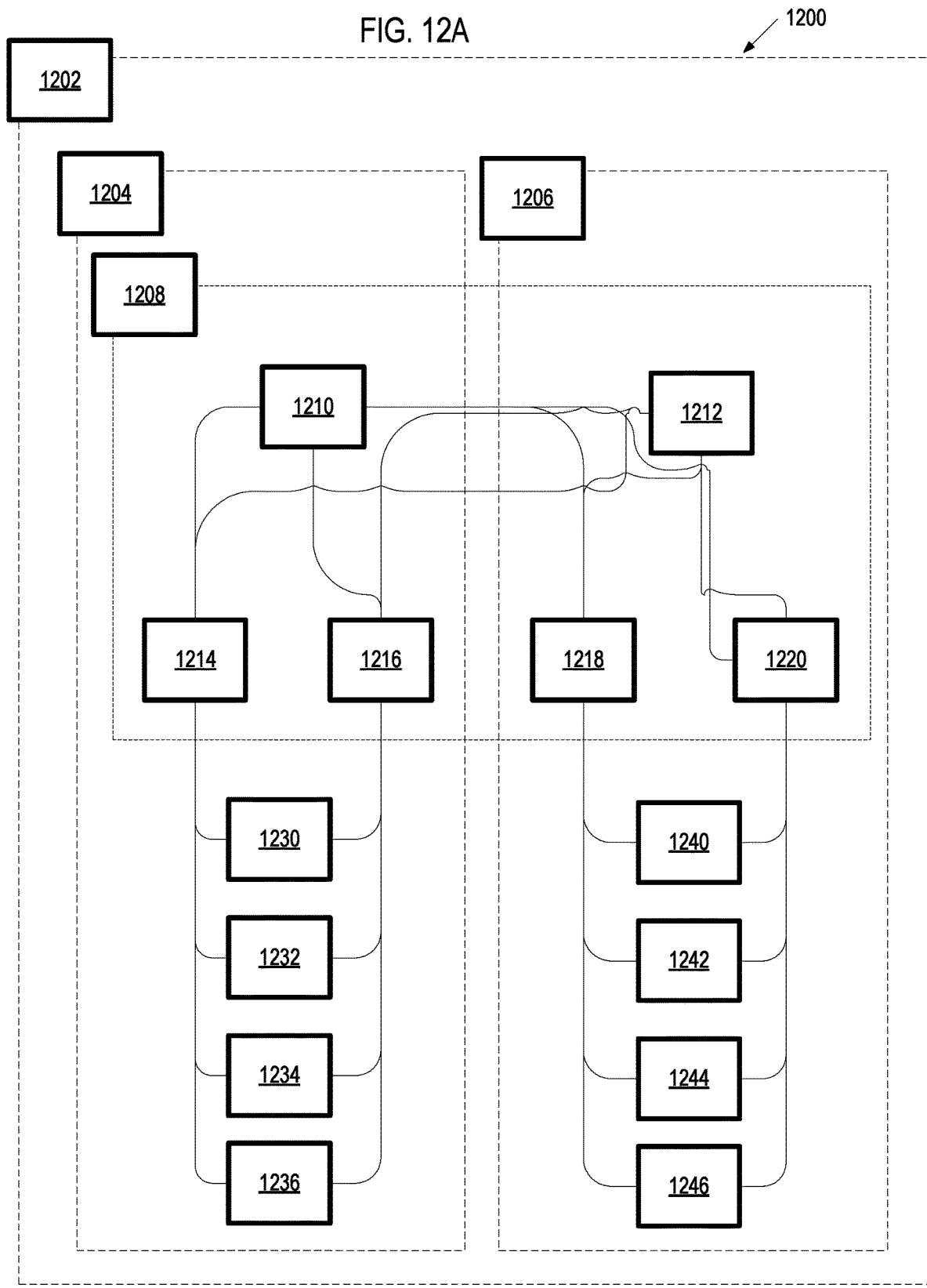

NETWORKING VISUALIZATIONS THAT UPDATE DATA MODEL AND DEPLOY SERVER NODES

RELATED APPLICATIONS

The present application is a continuation of application Ser. No. 15/908,131 filed Feb. 28, 2018, entitled "Networking Visualizations that Update Data Model and Deploy Visualization," which is incorporated by reference herein.

TECHNICAL FIELD

The present disclosure is generally related to network configuration, and is more specifically related to generating a network visualization of a network and configuring the network using the visualization.

BACKGROUND

Data centers may include networked devices within a defined network topology. The networked devices are each configured based on specific network configurations in order to communicate with each other and provide a distributed service. Configuration options of the networked devices should agree with each other in order to provide adequate service. Mistakes in configuration properties of networked devices may lead to errors and data traffic may flow in unexpected and undesirable ways.

BRIEF DESCRIPTION OF THE DRAWINGS

The disclosure is illustrated by way of examples, and not by way of limitation, and may be more fully understood with references to the following detailed description when considered in connection with the figures, in which:

FIGS. 12A and 12B are example representations of the graphical user interface displaying a network topology and displaying a node with components within the network topology.

DETAILED DESCRIPTION

Figure 1:
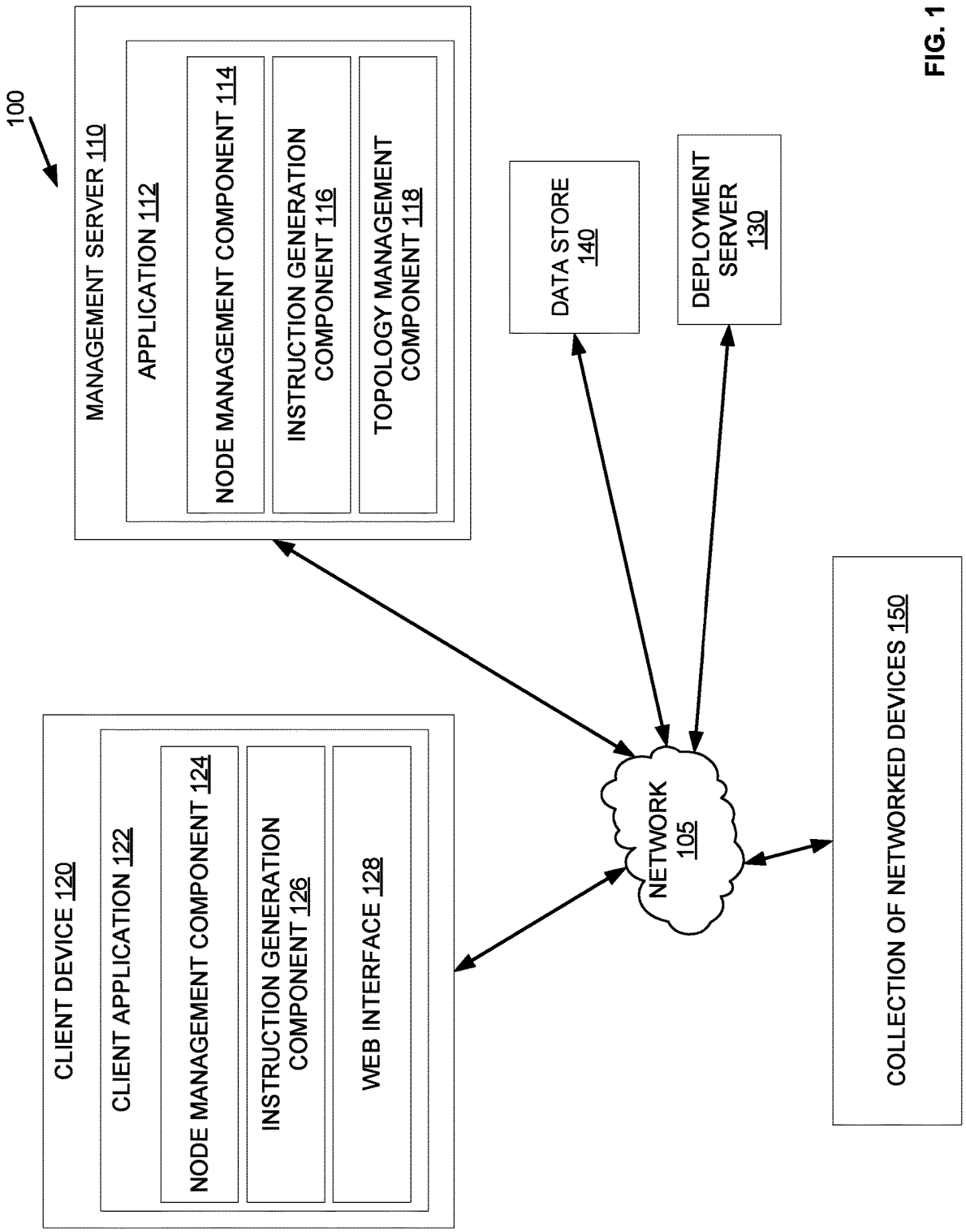
FIG. 1 depicts a high-level diagram of an example system architecture operating in accordance with one or more aspects of the present disclosure.

Configuration of a network involves designing a network topology of networked devices and configuring each networked device to operate within the network topology. However, configuring each networked device is a tedious process that when performed manually may be susceptible to configuration errors that may lead to bugs in the networking service. In order for an engineer to successfully configure the networked devices the engineer needs to make sure that configuration values between the networked devices agree in order to ensure successful communication between devices. How networked devices are connected may determine which values should match in order to provide distributed services throughout the network. For example, IP addresses need to be in the same subnet for devices to communicate at network layer 3 across a networking link. If for example, layer 2 virtual local area network (LAN) configurations are not correct then networking traffic flow within the layer 2 LAN may cause errors or flow in unexpected and undesirable ways.

Conventionally, network engineers may use a spreadsheet of configuration values to keep track of configurations for each networking device. However, as network systems become larger and more complex, manually maintaining spreadsheets may become too complex and may lead to errors in reading and/or translating the spreadsheet into configuration instructions. Visual user interfaces have been developed to aid network engineers by providing a visual representation of the network configurations based on their configuration spreadsheets. However, visual user interfaces that are based on configuration spreadsheets will still suffer from errors related to configuration mistakes made within the spreadsheets.

In addition, visual representations of network configurations still need to be translated into configuration instructions for each of the networked devices to be configured. Network engineers are still left with the task of translating visually represented network topologies into configuration values for each of the networked devices, which may often lead to errors during device setups. Translation software available may allow network engineers the ability to translate a visual representation of a network topology into configuration files for each networked device. However, many of the translation solutions simply translate configuration values for each networked device into a configuration file. These generated configuration files generally specify a clean configuration of a networked device. However, full reconfiguration of a networked device may suffer from the unintended consequence of the networked device being offline during the configuration process. Having multiple networked devices within a network that are offline for a period of time may lead to unwanted downtime or connection refusals for customers.

Accordingly, aspects of the present disclosure address the above and other deficiencies by automatically generating a network topology of a plurality of networked devices and providing a graphical user interface with the automatically generated topology of networked devices. The network topology depicted in the GUI may comprise a plurality of nodes, where each node may represent one or more networked devices, and indications of the interconnectivity between each of the nodes. Each of the nodes may contain configuration information including property values for components of the networked devices. The automatically generated network topology may be based upon received configuration information describing current configurations of the networked devices. By automatically generating the network topology from current configurations of the networked devices within the topology for presentation in the GUI, unnecessary configuration errors attributed to maintaining spreadsheets of configuration values by network engineers may be avoided. In addition, the creation of incorrect visual topologies generated based upon the spreadsheets may be avoided as well.

In an implementation, the graphical user interface of the network topology may be provided to a client device to display for a network engineer. The graphical user interface may be configured to allow user input requesting a change to the network topology. User input may include updates to configurations of networked devices and/or requests to add new network devices to the topology. A management server may be configured to receive the user input and determine one or more nodes that are impacted by the change. For instance, if the change specifies a new connection between server A and switch X, then the management server may determine the impacted nodes as server A and switch X. The management server may determine, for each impacted node, the components to be configured in view of the change. For instance, the management server may determine that interface 0 of switch X should now be configured to connect to server A and port 1 of server A should now be configured to connect to switch X. The management server may generate configuration instructions that specify the configuration changes for the affected components of the impacted nodes and may provide the configuration instructions to a deployment server to implement the requested changes. By automatically generating configuration instructions, errors in translating network changes to network device configurations may be avoided.

In an implementation, the management server may determine that the user input specifies a request to generate a node. For example, the user input may specify adding a new server to an existing rack. The management server may generate a new node that represents the newly added networked device, e.g., the new server. The management server may determine which existing nodes are impacted by adding the new node. For example, the node representing the rack and other networked devices within the rack may be impacted by adding the new server. The management server may generate configuration instructions that include instructions for configuring components of the new node and instructions to configure components of the impacted nodes.

In an implementation the configuration instructions may represent structured data formatted to be parsed by a deployment application and/or process. The configuration instructions may be formatted using a markup language, such as Yet Another Markup Language (YAML), Extensible Markup Language (XML), or any other formatted language. The configuration instructions may be configured to only specify changes to the components necessary to update the impacted nodes while preserving the configuration of other components within the node. By only updating the specific components that need updating, the server may be able to make specific changes to networked devices without the need of taking the entire networked device offline to update specific configurations; thereby decreasing network downtimes of the networked devices.

In an implementation, the management server may be configured to identify the plurality of nodes that make up the network topology. The management server may be configured to receive topology information from the deployment server. The topology information may include configuration information for the networked devices within the network topology including property values for components of the one or more networked devices.

In an implementation, the management server may be configured to provide the configuration instructions to a deployment server to implement the requested change. The deployment server may be configured to access each of the networked devices to update the configuration values based upon the configuration instructions. Upon implementation of the changes, the deployment server may send updated topology information to the management server. The management server may receive the updated topology information and generate an updated graphical user interface that includes updates to the impacted nodes. The management server may then provide the updated graphical user interface to the client device.

In another implementation, the client device may be configured to receive topology information for a network topology. The client device may determine, from the topology information, a plurality of nodes in the network topology, locally. The client device may be configured to receive user input and determine nodes impacted by the change requested by the user input. The client device may generate and provide the configuration instructions to a management server for deployment of the requested change.

In an implementation, the graphical user interface may be configured to display real time updates of changes to networked devices. The deployment server may be configured to notify the management server of changes to the topology which may then be dynamically updated within the graphical user interface. By displaying real time changes to nodes, network engineers are ensured that the network topology displayed within the graphical user interface represents the current configuration of the network.

Often network configurations may involve physical changes to networked devices as well as configuration changes. Physical changes may refer to changes to physical connectivity of the one or more impacted nodes. Configuration changes may refer to changes to configuration values of properties of the one or more impacted nodes. The management server and/or the client device may be configured to determine physical changes and configuration changes for impacted nodes based on the user input received. By determining separate physical and configuration changes, the management server and/or the client device may determine specific configuration changes that may be applied in response to completion of the physical changes to impacted nodes. Thereby simplifying the network configuration tasks by differentiating between preliminary physical tasks and configuration tasks that may be automatically performed.

In an implementation, the management server may be configured to cause a notification of the physical change instructions to be performed on the one or more impacted nodes. The notification may be displayed within the client device to inform the network engineer of the physical tasks to be completed. The management server may be configured to determine whether the physical changes have been implemented on the one or more impacted nodes and upon determination, the management server may provide the configuration change instructions to a deployment server to implement the configuration changes to properties of the one or more impacted nodes, thereby simplifying network changes into a multi-step process that ensures that the configuration changes are implemented after the necessary physical change instructions have been completed.

In an implementation, the notification of physical changes may be incorporated within the updated graphical user interface that may include the plurality of nodes and an indication of the one or more impacted nodes with the notification of the physical change instructions.

In an implementation, the management server and/or client device may provide a graphical user interface that allows configuration of a new network topology of networked devices. The management server and/or the client device may receive, via the graphical user interface, user input requesting generation of one or more new nodes in the network topology. The one or more new nodes may represent one or more networked devices and interconnectivity between the one or more networked devices. The management server and/or client device may generate physical configuration instructions and component configuration instructions for the one or more new nodes. The component configuration instructions may be implemented by the deployment server upon completion of the physical change instructions.

Accordingly, aspects of the present disclosure may significantly reduce configuration errors by automatically translating configuration changes from user input on the graphical user interface into configuration instructions that are provided to a deployment server for implementation on the impacted networked devices. Additionally, network downtimes may be reduced by generating configuration instructions that specify updates to only the properties of network devices that need changing. By selectively updating property values of the select components, network devices may remain online during configuration updates, thereby increasing network availability and reliability.

FIG. 1 illustrates an example system architecture 100 in which implementations of the disclosure may operate. The system architecture 100 may include management server 110, client device 120, deployment server 130, data store 140, and a collection of networked devices 150. Each of the management server 110, the client device 120, the deployment server 130, the data store 140, and the collection of networked devices 150 are communicatively coupled via network 105. Although one client device 120 is shown, it should be understood that any suitable number of client devices may be included in the system architecture 100 and the other client devices may include similar components and features as client device 120. The network 105 may be a public network (e.g., the Internet), a private network (e.g., a LAN of wide area network (WAN)), or a combination thereof. Network 105 may include a wireless infrastructure, which may be provided by one or more wireless communication systems, such as a wireless fidelity (WiFi) hotspot connected with the network 105 and/or a wireless carrier system that can be implemented using various data processing equipment, communication towers, etc. Additionally or alternatively, network 105 may include a wired infrastructure (e.g., Ethernet).

The management server 110 may comprise one or more processors communicatively coupled to memory devices and input/output (I/O) devices. The management server 110 may include application 112. Application 112 may include logic implemented as computer instructions stored in one or more memories and executed by one or more processing devices of the management server 110. Application 112 may include processing logic for managing visualizations of a network topology and generating instructions to create and update the network topology. Application 112 may include a node management component 114, an instruction generation component 116, and a topology management component 118. Node management component 114 may include logic to manage a plurality of nodes that represent networked devices within a network. Networked devices may represent any computing device configured to communicate with other devices through a network connection. Examples of networked devices include, but are not limited to, server computers, client computers, routers, switches, Ethernet hubs, bridges, repeaters, or any other computing device capable of connecting and communicating over a network. The node management component 114 may include logic to manage configuration properties for the networked devices. For example, the node management component 114 may identify, store, and update configuration properties for different ports within a switch.

The instruction generation component 116 may include logic to generate sets of configuration instructions for various networked devices. Configuration instructions may include, but are not limited to, component configuration instructions for configuring component properties of networked devices and physical configuration instructions that describe physical configuration steps that may need to be taken to configure a networked device. For example, if a new router is added to a group, the physical instructions for the new router may describe which cables need to be plugged into specific ports in order to correctly configure the newly added router. The topology management component 118 may include logic to send and receive topology information and configuration instructions to the deployment server 130 and the client device 120. For example, the deployment server 130 may send topology information about one or more networked devices to the topology management component 118 and the management server 110 may send, via the topology management component 118, configuration instructions for one or more networked devices to the deployment server 130.

The client device 120 may represent various computing devices such as personal computers (PCs), laptops, mobile phones, smart phones, tablet computers, network connected televisions, netbook computers etc. In some implementations, client device 120 may also be referred to as a "user device." The client device 120 may include client application 122. Client application 122 may include logic implemented as computer instructions stored in one or more memories and executed by one or more processing devices of the client device 120. Client application 122 may include a node management component 124, an instruction generation component 126, and a web interface 128. Node management component 124 may include logic to manage a plurality of nodes that represent the networked devices within the network. The instruction generation component 126 may include logic to generate sets of configuration instructions for various networked devices. The web interface 128 may include logic to display a graphical user interface of the network topology that includes graphical representations of the plurality of nodes and interconnectivity between the plurality of nodes. The web interface 128 may be configured to receive user input that may specify one or more changes to the network topology. User input may add new nodes, remove existing nodes from the network topology, and modify configuration values for existing nodes.

In an implementation, the deployment server 130 may be configured to manage deployment of configuration values for one or more networked devices. For example, the deployment server 130 may receive configuration instructions to configure a set of routers to support the Open Shortest Path First (OSPF) protocol. The deployment server 130 may establish connections to each of the routers and may update configuration values for each of the routers to support OSPF. In an implementation, the collection of networked devices 150 represents the one or more networked devices within the network. Each of the networked devices in the collection of networked devices 150 may communicate with the deployment server 130, the management server 110, and client device 120 to send current configuration information and receive updated configuration information.

In an implementation, the data store 140 may be configured to store configurations of the plurality of nodes within a network topology. The management server 110 and/or the client device 120 may retrieve and store topology information, including configuration states of the plurality of nodes in the data store 140. The data store 140 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

Figure 2:
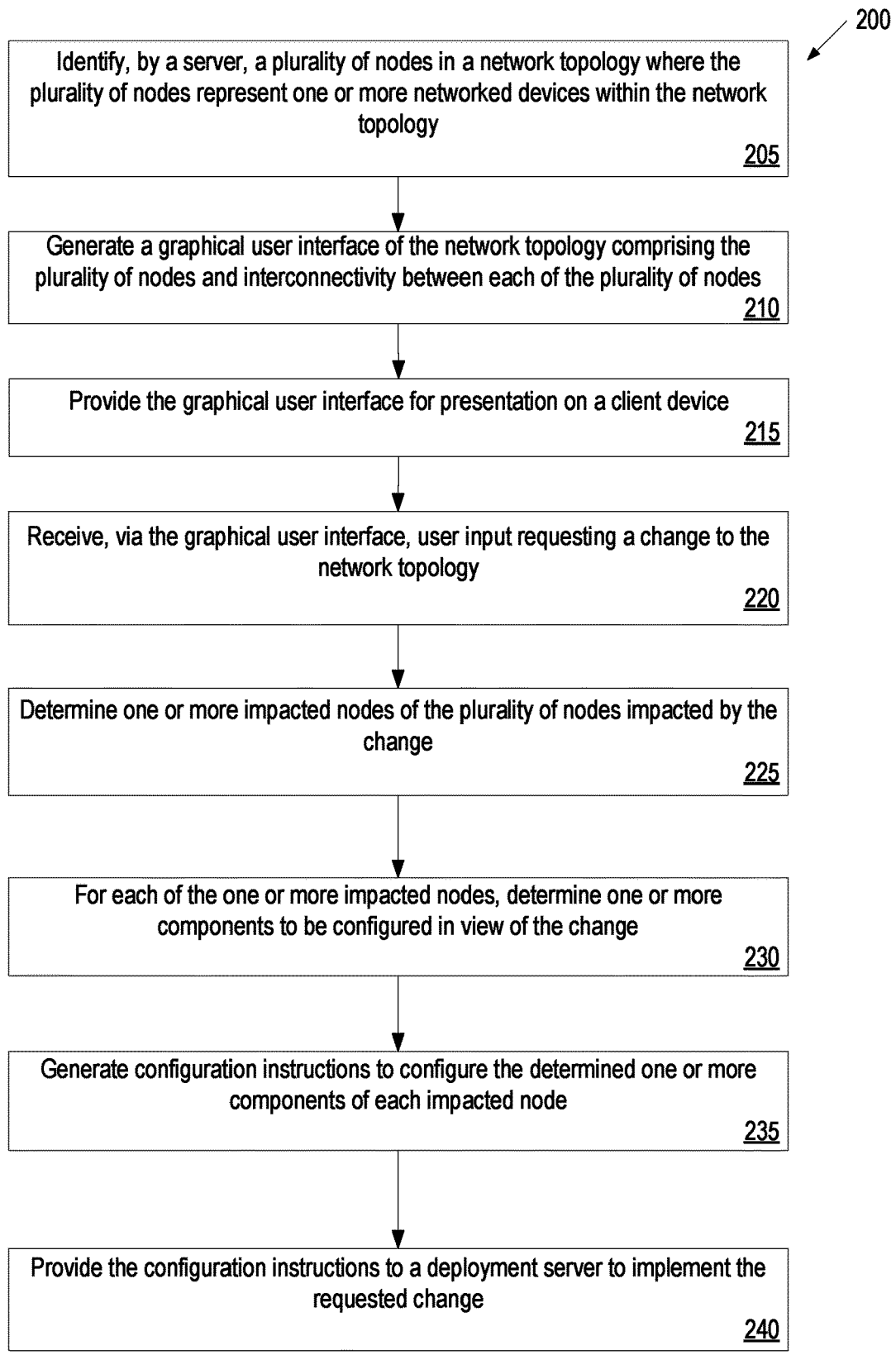
FIG. 2 depicts a flow diagram of an example method for generating and providing configuration instructions to configure one or more networked devices based upon a requested change to a network topology, in accordance with one or more aspects of the present disclosure.

FIG. 2 depicts a flow diagram of an example method for generating and providing configuration instructions to configure one or more networked devices based upon a requested change to a network topology, in accordance with one or more aspects of the present disclosure. Method 200 and each of its individual functions, routines, subroutines, or operations may be performed by one or more processing devices of the computer device executing the method 200. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In an implementation, method 200 may be performed by the application 112 executed by one or more processing devices of the management server 110.

At block 205, a processing device may identify a plurality of nodes in a network topology. In an implementation, the plurality of nodes may represent one or more networked devices within the network topology. For example a node may represent single networked device such as a switch. Additionally, a node may represent a collection of networked devices. For instance, a particular node may represent a rack that may contain a plurality of switches and a plurality of servers. In yet other examples, a node may represent the entire network topology as a specific site. In implementations, the plurality of nodes may represent one or more networked devices and each of the nodes may include one or more components that specify configuration properties for the included networked devices.

In an implementation, the processing device may receive network topology information from the deployment server 130. The deployment server 130 may be configured to communicate with each networked device within the network to receive current configuration information for each of the networked devices. For example, the networked devices within the collection of networked devices 150 may each provide current configuration information to the deployment server 130 which may then provide the current configuration information to the topology management component 118 of the management server 110. Examples of current configuration information may include a networked device identifier, a rack identifier, site identifier, interface identifiers specifying each interface and connection information for each interface, IP address, subnet, supported network layers, and any other configurable property values.

In an implementation, the processing device may identify the plurality of nodes that make up the network topology and assign property information one or more components that make up each node. For instance, of a node represents a server, then the components may include IP address, ports for connected switches, the server name, the rack the server is located in, and any other applicable information. In another example, if a node represents an OSPF protocol, then the components of the node may include each of the switches within the OSPF protocol including property information for each switch.

At block 210, the processing device may generate a graphical user interface of the network topology including the plurality of nodes identified and interconnectivity between each of the plurality of nodes. In an implementation, the node management component 114 may determine interconnectivity between identified nodes using property information described within components in each of the nodes. The graphical user interface may represent a graphical representation of the network topology including graphical representations of each node in the plurality of nodes and connections between each of the nodes.

FIG. 12A is an example representation of the graphical user interface for a network topology. Site node 1202 represents a network site that contains the other nodes. Site node 1202 has a distinct icon that is specific to all site nodes and includes border lines that indicate the other nodes that are located within site node 1202. Rack nodes 1204 and 1206 each represent a rack within site node 1202. Rack nodes 1204 and 1206 have distinct icon graphics that distinguish them as racks and each have border lines to show which nodes are located within each rack. For example, rack node 1204 contains switch nodes 1210, 1214, and 1216 and server nodes 1230-1236. Protocol node 1208 represents an OSPF protocol and has border lines to indicate which nodes are configured for OSPF. Switch nodes 1210-1220 each represent a different switch. Each of the switch nodes has connection lines between other nodes. For example, switch node 1214 has lines connecting to switch nodes 1210, 1212, and server nodes 1230-1236. Each of the connection lines represents a physical connection to another node. Server nodes 1230-1246 each represent a server within the network topology. Each of the server nodes may have distinct icon graphics that distinguish them as servers and may have connecting lines showing connections to other devices.

Figure 12B:
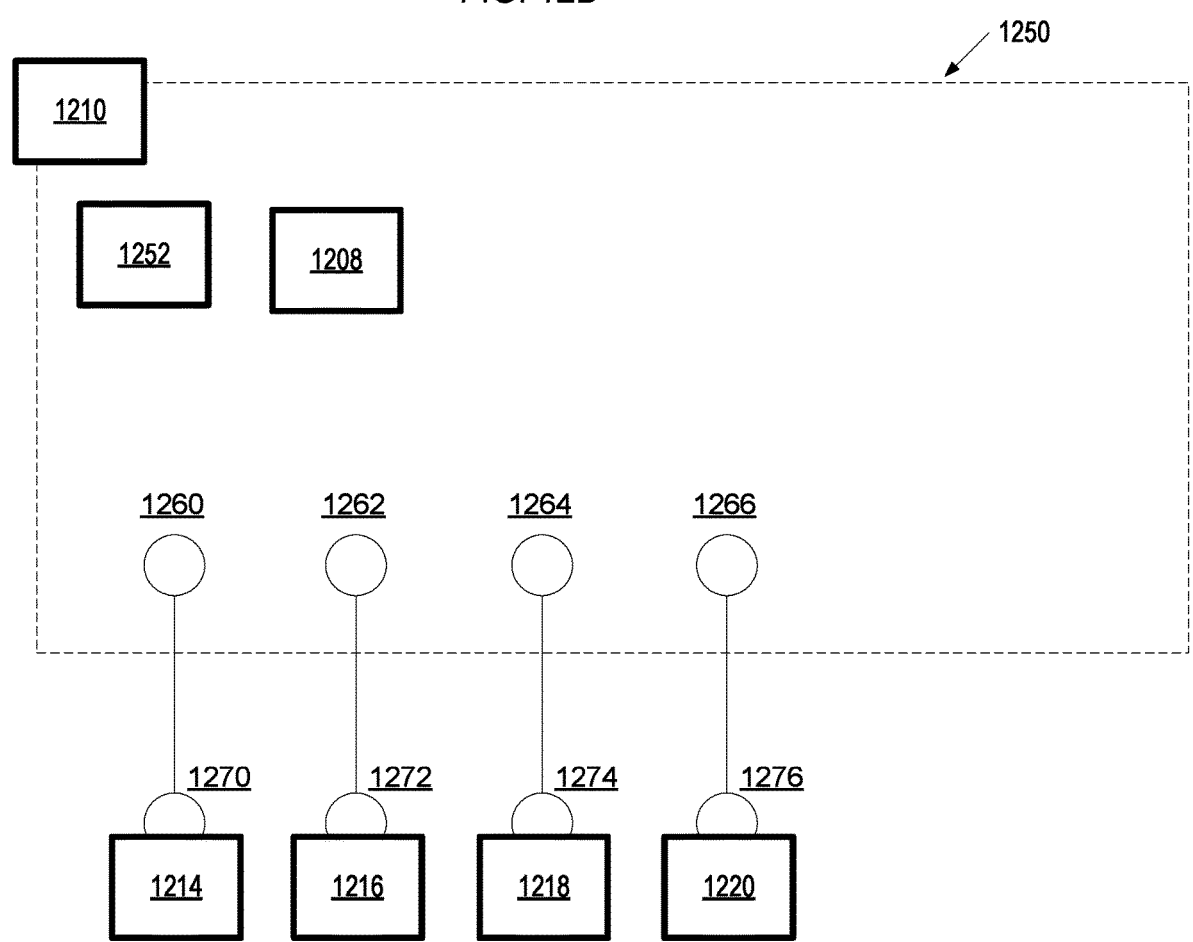

The graphical user interface may be interactive and may include detailed graphical representations for each of the nodes. In an implementation, a user using client device 120 may select a specific node and the graphical user interface may present a detailed view of the selected node including component property information that describes the connective properties of the selected node. FIG. 12B is an example representation of the graphical user interface displaying a specific node and components of the specific node. View 1250 displays switch node 1210 and the components of switch node 1210. The border lines of switch node 1210 indicate components within switch node 1210. Interface 1260-1266 are port interfaces of switch node 1210 and connect to other switch nodes. For example, interface 1260 connects to interface 1270 of switch node 1214. Interface 1262 connects to interface 1272 of switch node 1216. Interface 1264 connects to interface 1274 of switch node 1218. Interface 1266 connects to interface 1276 of switch node 1220. Switch node 1210 also contains component property information describing configuration details for switch node 1210. For example, protocols node 1208 and protocol node 1252 indicate that switch node 1210 is configured for OSPF and Border Gateway Protocol (BGP) respectively.

At block 215, the processing device may provide the graphical user interface for presentation on a client device. In an implementation, the topology management component 118 may send the graphical user interface to client device 120. Client device 120 may be configured to receive the graphical user interface and display the graphical user interface within web interface 128.

At block 220, the processing device may receive user input requesting a change to the network topology. In an implementation, user input may be received by the topology management component 118, via the graphical user interface that has been presented on the client device 120. For example, user using the client device 120 may select one or more nodes for update and may provide user input requesting a change to nodes within the network topology. Updates may be provided by selecting a node and changing one or more property values within the node, drawing a connecting line between two nodes, selecting a node for deletion, or by dragging and icon of a new node for creation.

At block 225, the processing device may determine one or more impacted nodes of the plurality of nodes impacted by the change received. In an implementation, the node management component 114 may determine the one or more impacted nodes based upon the user input received. If the user input specifies changes to component properties of switch node 1210, then the node management component 114 may determine based upon the specific changes which nodes may be impacted by the change. For example, if the change removes switch node 1210 from the OSPF protocol, then protocol node 1208 may be impacted and may need changes to specific component properties. If the user input specifies a new connection line between switch node 1210 and another node then the node management component 114 may determine that the impacted nodes are the nodes connected by the new line. If the user input specifies a new node, then the node management component 114 may determine each of the connected nodes that may be impacted by the newly created node.

At block 230, the processing device may determine, for each of the impacted nodes, one or more components to be configured in view of the change. In an implementation, the node management component 114 may determine new property values for each of the components that may be affected by the change. For example, if switch node 1214 contains a new connection to switch node 1212, then the node management component 114 may determine that interface 1 of switch node 1214 is to be connected to interface 0 of switch node 1212 as each of these interfaces were previously unused interfaces. Node management component 114 may then determine that the property value for interface 1 (switch node 1214) equals "interface 0-switch node 1212" and the property value for interface 0 (switch node 1212) equals "interface 1-switch node 1214".

In an implementation, the node management component 114 may be configured to automatically determine property values of components based upon the user input and the available resources of the nodes. For example, if components representing free interfaces are connected, then the node management component 114 may automatically assign property values to the nodes based on availability. If however, the user input specifies property values, then the node management component 114 may be configured to update the property values based on the specific user inputs.

At block 235, the processing device may generate configuration instructions to configure the determined one or more components of each impacted node. In an implementation, the instruction generation component 116 may generate configuration instructions that specify the specific property value updates for components of each impacted node. For example, the configuration instructions may include updated property values for each component that needs updating for each impacted node. In an implementation, the configuration instructions may be stored within the data store 140.

In an implementation, the configuration instructions generated by the instruction generation component 116 and may be formatted to only include configuration values specific to the updated properties. For example, if an impacted node is switch node 1210 and the new property values related to interfaces 0 and 1, then the configuration instructions may include information identifying switch node 1210 and property values to update interfaces 0 and 1 of switch node 1210. Other interfaces, such as interface 2 and 3, may not need updating and therefore may not be included within the configuration instructions. By only providing configuration information for updating necessary property values, updates of the impacted nodes may be more efficient and may not require any downtime from actions such as rebooting the networked device.

At block 240, the processing device may provide the configuration instructions to a deployment server to implement the requested change. In an implementation, the topology management component 118 may be configured to send the configuration instructions to the deployment server 130. In an implementation, the deployment server 130 may parse the configuration instructions and may deploy the configuration instructions to each specific networked device within the collection of networked devices 150.

Figure 3:
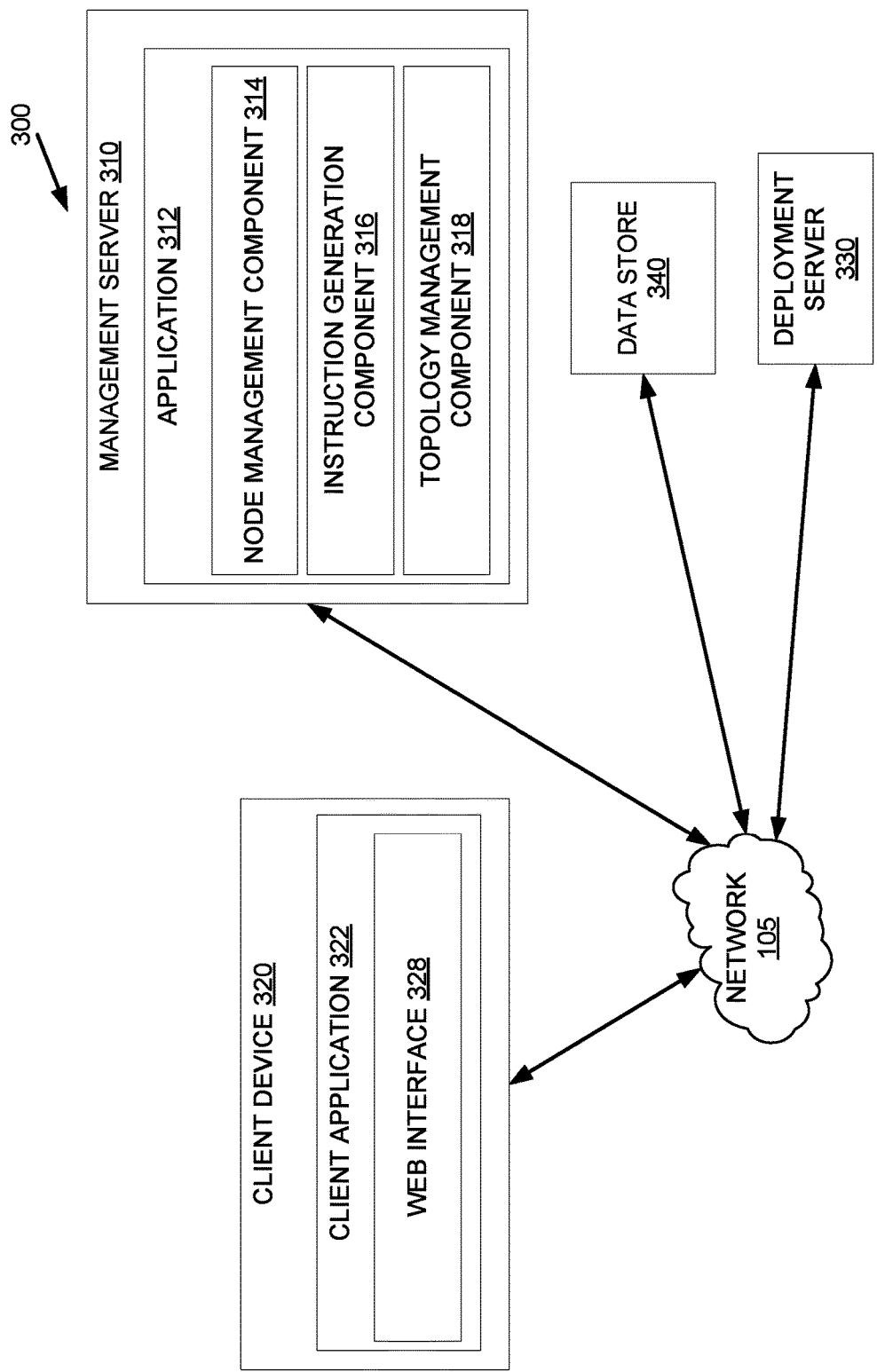
FIG. 3 depicts a block diagram of an example system for preforming the method of FIG. 2, in accordance with one or more aspects of the present disclosure.

FIG. 3 depicts a block diagram of an example system 300 for preforming the method of FIG. 2, in accordance with one or more aspects of the present disclosure. System 300 may be the same or similar to the system architecture 100 and may include one or more processing devices and one or more memory devices. In the example shown, system 300 may include management server 310, client device 320, deployment server 330, and data store 340. In an implementation, application 312 of management server 310 may include node management component 314, instruction generation component 316, and topology management component 318.

The topology management component 318 may be configured to receive topology information from the deployment server 330, send the graphical user interface to the client device 320, receive user input from the client device 320, and send configuration instructions to the deployment server 320. The node management component 314 may be configured to identify the plurality of nodes from the received topology information from the deployment server 330, determine one or more impacted nodes from the request change from the user input, and determine property values for one or more components of the one or more impacted nodes. The instruction generation component 316 may be configured to generate the configuration instructions based upon the requested change and the determined one or more components of the one or more impacted nodes. The instruction generation component 316 may be configured to store the configuration instructions in the data store 340.

In an implementation, client application 322 of client device 320 may include web interface 328. Web interface 328 may be configured to present the received graphic user interface of the network topology and receive user input requesting a change to the network topology. The requested change may be sent to application 312 to generate configuration changes associated with the requested change.

Figure 4:
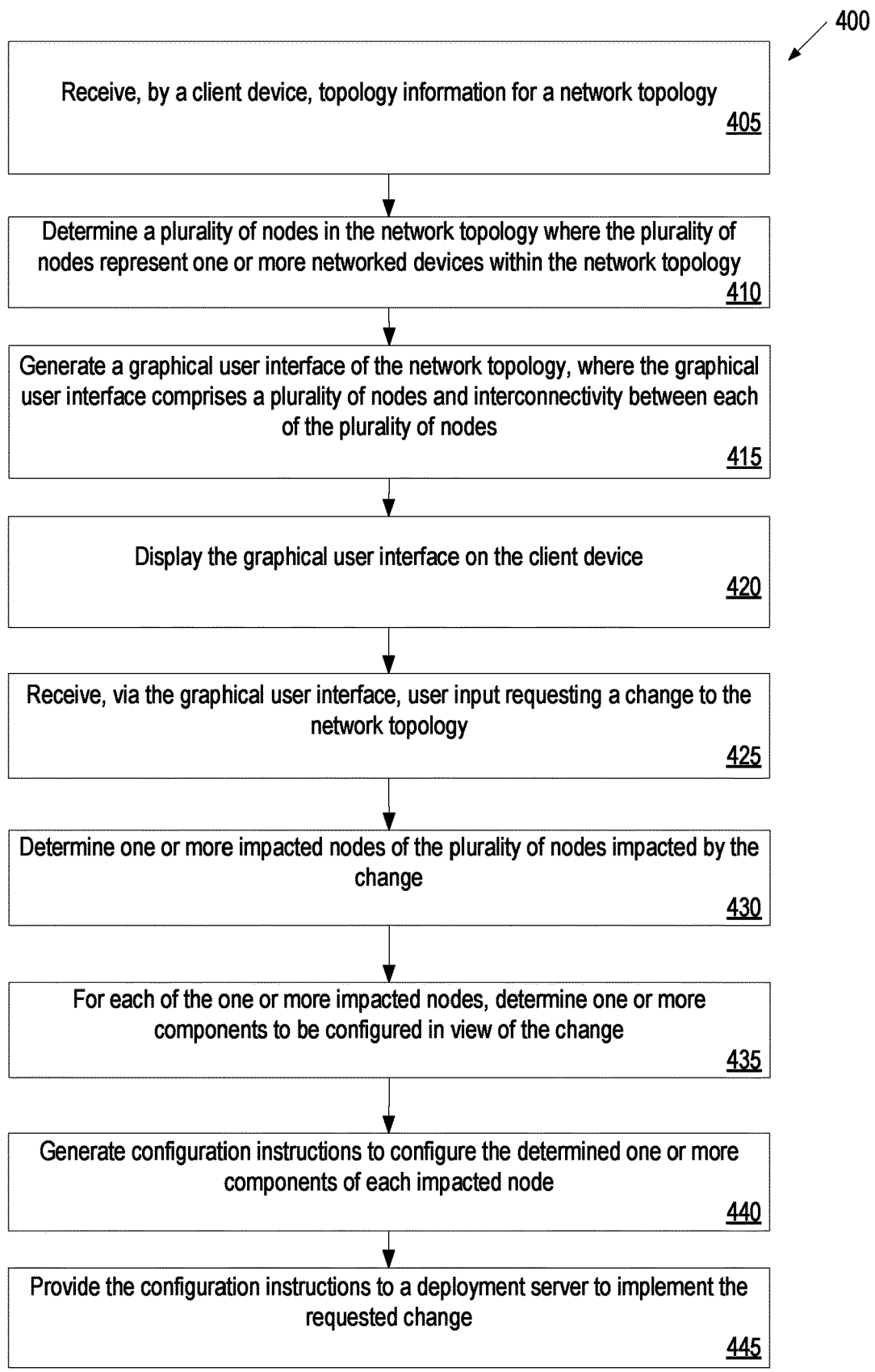
FIG. 4 depicts a flow diagram of an example method for a client device to generate and provide configuration instructions to configure one or more networked devices based upon a requested change to a network topology, in accordance with one or more aspects of the present disclosure.
Figure 5:
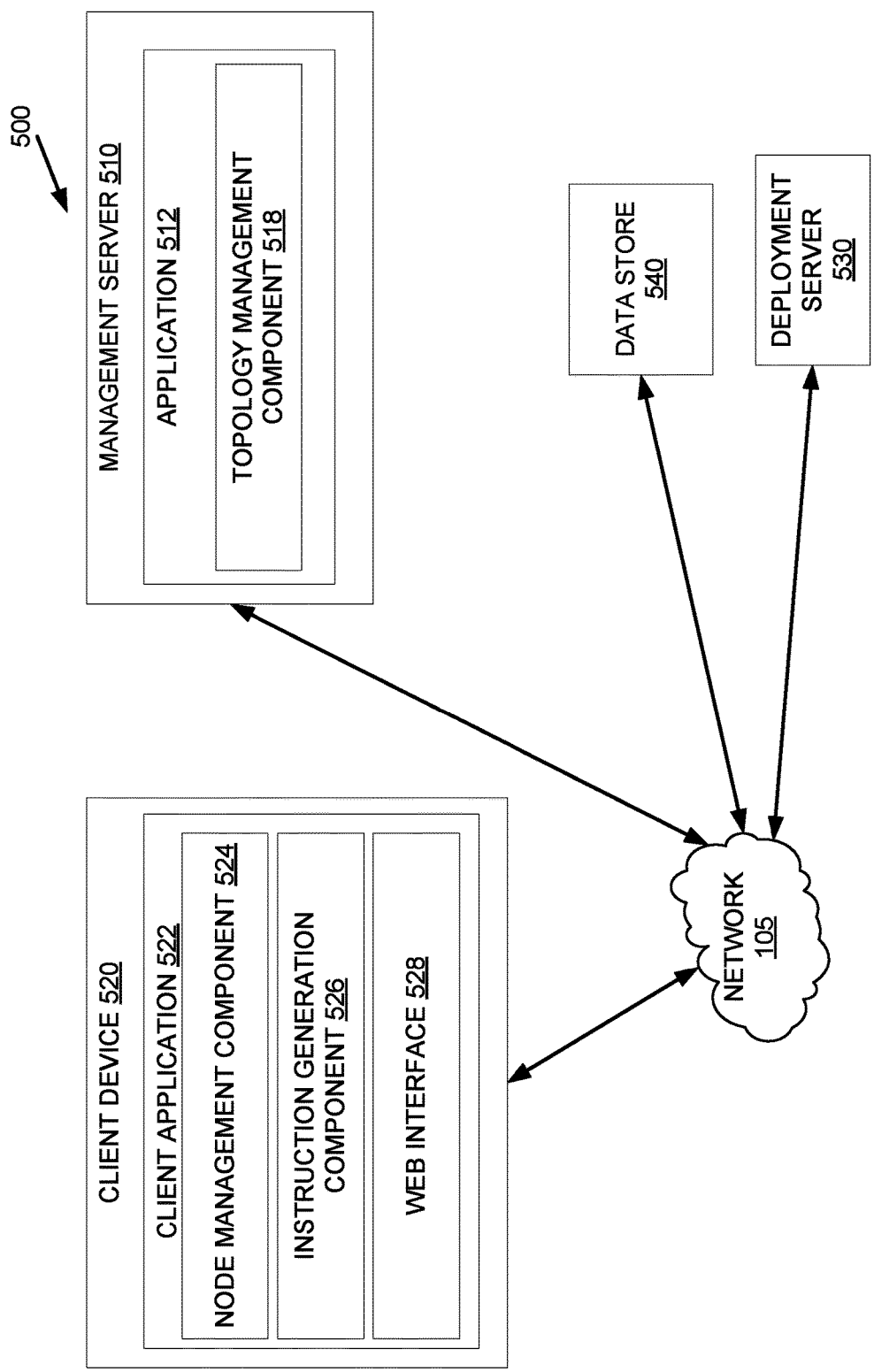
FIG. 5 depicts a block diagram of an example system for performing the method of FIG. 4, in accordance with one or more aspects of the present disclosure.

FIG. 4 depicts a flow diagram of an example method 400 for a client device to generate and provide configuration instructions to configure one or more networked devices based upon a requested change to a network topology, in accordance with one or more aspects of the present disclosure. FIG. 5 depicts a block diagram of an example system 500 for performing the method of FIG. 4, in accordance with one or more aspects of the present disclosure. System 500 may be the same or similar to the system architecture 100 and may include one or more processing devices and one or more memory devices. In the example shown, system 500 may include management server 510, client device 520, deployment server 530, and data store 540. Method 400 of FIG. 4 includes operations performed by client device 520. Also, method 400 may be performed in the same or a similar manner as described above in regards to method 200. Method 400 may be performed by the client application 522 executed by one or more processing devices of the client device 520.

At block 405, a processing device may receive topology information for the network topology. In an implementation, the node management component 524 of client application 522 from the client device 520 may be configured to receive topology information from topology management component 518 of application 512 from the management server 510. In another implementation, the node management component 524 may receive topology information directly from deployment server 530. The topology information may include current configuration information for one or more networked devices within the network topology.

At block 410, the processing device may determine a plurality of nodes in the network topology where the plurality of nodes may represent one or more networked devices within the network topology. In an implementation, the node management component 524 may identify and determine the plurality of nodes to represent one or more networked devices within the network topology.

At block 415, the processing device may generate a graphical user interface of the network topology including the plurality of nodes identified and interconnectivity between each of the plurality of nodes. In an implementation, the node management component 524 may determine interconnectivity between identified nodes using property information described within components in each of the nodes. The graphical user interface may represent a graphical representation of the network topology including graphical representations of each node in the plurality of nodes and connections between each of the nodes.

At block 420, the processing device may display the graphical user interface on the client device 520. In an implementation, the web interface 528 may be configured to display on a display component of the client device 520 the graphical user interface.

At block 425, the processing device may receive user input requesting a change to the network topology. In an implementation, user input may be received at the web interface 528 via the graphical user interface. The user input may specify an update by selecting a node and changing one or more property values within the node, drawing a connecting line between two nodes, selecting a node for deletion, or by dragging and icon of a new node for creation.

At block 430, the processing device may determine one or more impacted nodes of the plurality of nodes impacted by the change received. In an implementation, the node management component 524 may determine the one or more impacted nodes based upon the user input received. If the user input specifies a new node, then the node management component 524 may determine each of the connected nodes that may be impacted by the newly created node.

At block 435, the processing device may determine, for each of the impacted nodes, one or more components to be configured in view of the change. In an implementation, the node management component 524 may determine new property values for each of the components that may be affected by the change.

At block 440, the processing device may generate configuration instructions to configure the determined one or more components of each impacted node. In an implementation, the instruction generation component 526 may generate configuration instructions that specify the specific property value updates for components of each impacted node. For example, the configuration instructions may include updated property values for each component that needs updating for each impacted node. In an implementation, the configuration instructions may be stored within the data store 540. In another implementation, the instruction generation component 526 may store the configuration instructions within local memory of the client device 520.

In an implementation, the configuration instructions generated by the instruction generation component 526 may be formatted to only include configuration values specific to the updated properties. For example, if an impacted node is switch node 1210 and the new property values related to interfaces 0 and 1, then the configuration instructions may include information identifying switch node 1210 and property values to update interfaces 0 and 1 of switch node 1210. Other interfaces, such as interface 2 and 3, may not need updating and therefore may not be included within the configuration instructions. By only providing configuration information for updating necessary property values, updates of the impacted nodes may be more efficient and may not require any downtime from actions such as rebooting the networked device.

At block 445, the processing device may provide the configuration instructions to the management server 510 for deployment of the requested change. In an implementation, the instruction generation component 526 may send the configuration instructions to the topology management component 518. The topology management component 518 may be configured to send the configuration instructions to the deployment server 530. In an implementation, the deployment server 130 may parse the configuration instructions and may deploy the configuration instructions to each specific networked device.

In an implementation, the client application 520 may be configured to display updated topology information after the requested changes have been implemented on the one or more impacted nodes. The node management component 522 may be configured to receive updated topology information for the network topology from the topology management component 518. The updated topology information may include changes to the one or more impacted nodes. For example, if the requested change included adding a new switch, then the updated topology information may include information related to the new switch and connectivity information related to the new switch.

In an implementation, the node management component 524 may generate an updated graphical user interface that includes the plurality of nodes with the changes received from the updated topology information. The updated graphical user interface may be displayed within the web interface 528.

In an implementation, the node management component 524 may be configured to indicate, within the updated graphical user interface, the one or more impacted nodes that include changes from the updated topology information. For example, updated nodes may be highlighted or may include icons of a different color to indicate the update. These indicators may be beneficial to a user for identifying recent changes to the network topology.

In an implementation, the web interface 528 may be configured to display the updated graphical user interface as a side-by-side view of the original network topology from the graphical user interface and the updated network topology in the updated graphical user interface. This may be beneficial to view changes to nodes as a before and after view.

In another implementation, the web interface 528 may be configured to display the updated graphical user interface as an overlay view of the original network topology from the graphical user interface and the updated network topology in the updated graphical user interface. The overlay view may be used to show connection changes between updated nodes.

In an implementation, requested changes to one or more impacted nodes may include physical changes and configuration changes. Physical changes may refer to change to the physical connectivity of a networked device. For example, if a server or switch needs to be moved from one rack to another, a deployment server is incapable of performing the physical connectivity changes required for the move. Instead the physical changes may be performed by a network engineer. Upon performance of the physical changes, such as moving the server or switch to another rack, the deployment server may complete the move by implementing the configuration changes to update the configuration values of the newly moved networked devices.

Figure 6:
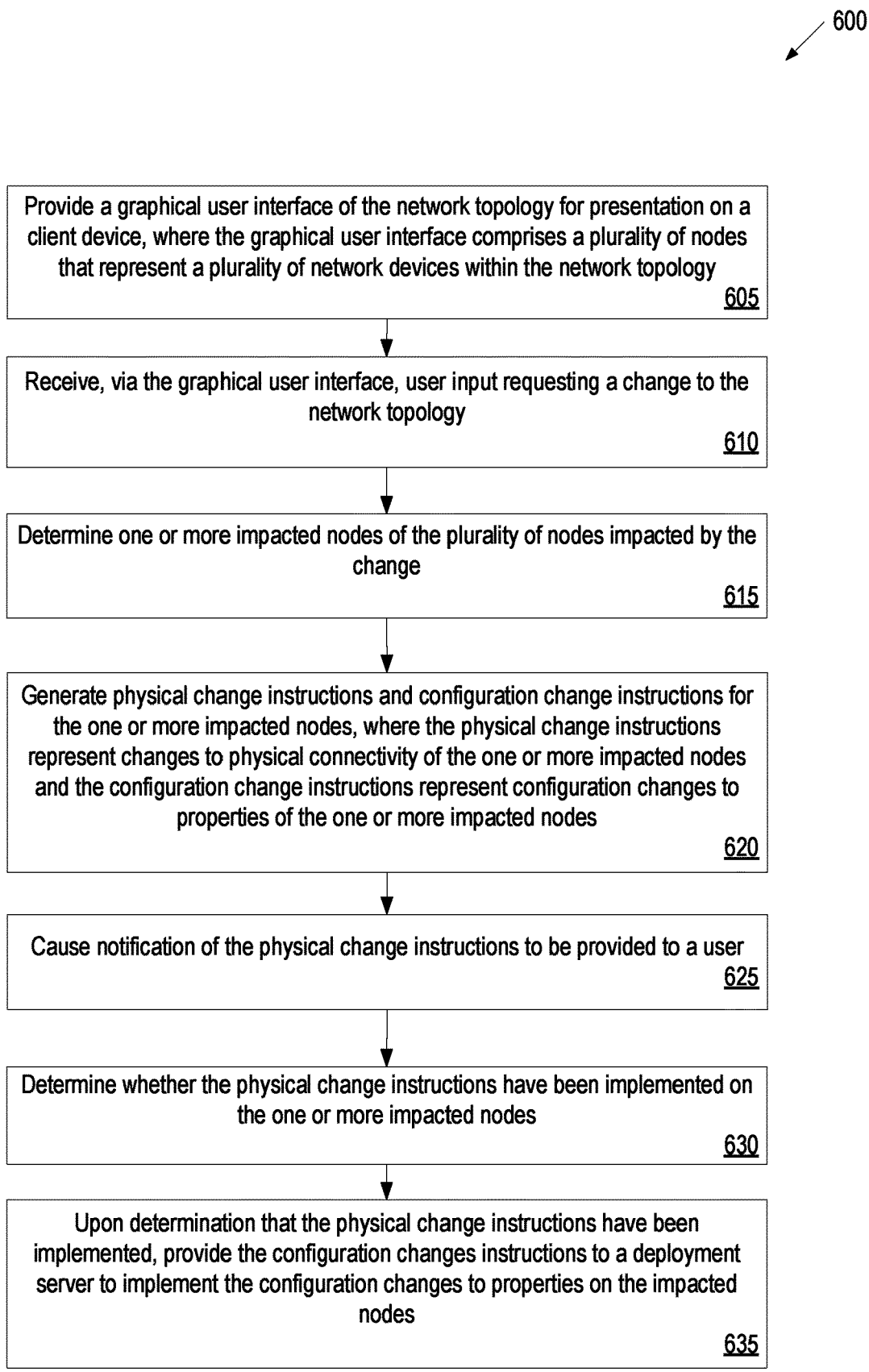
FIG. 6 depicts a flow diagram of an example method for a server to generate and provide physical change instructions and configuration change instructions to configure one or more networked devices based upon a requested change to a network topology, in accordance with one or more aspects of the present disclosure.
Figure 7:
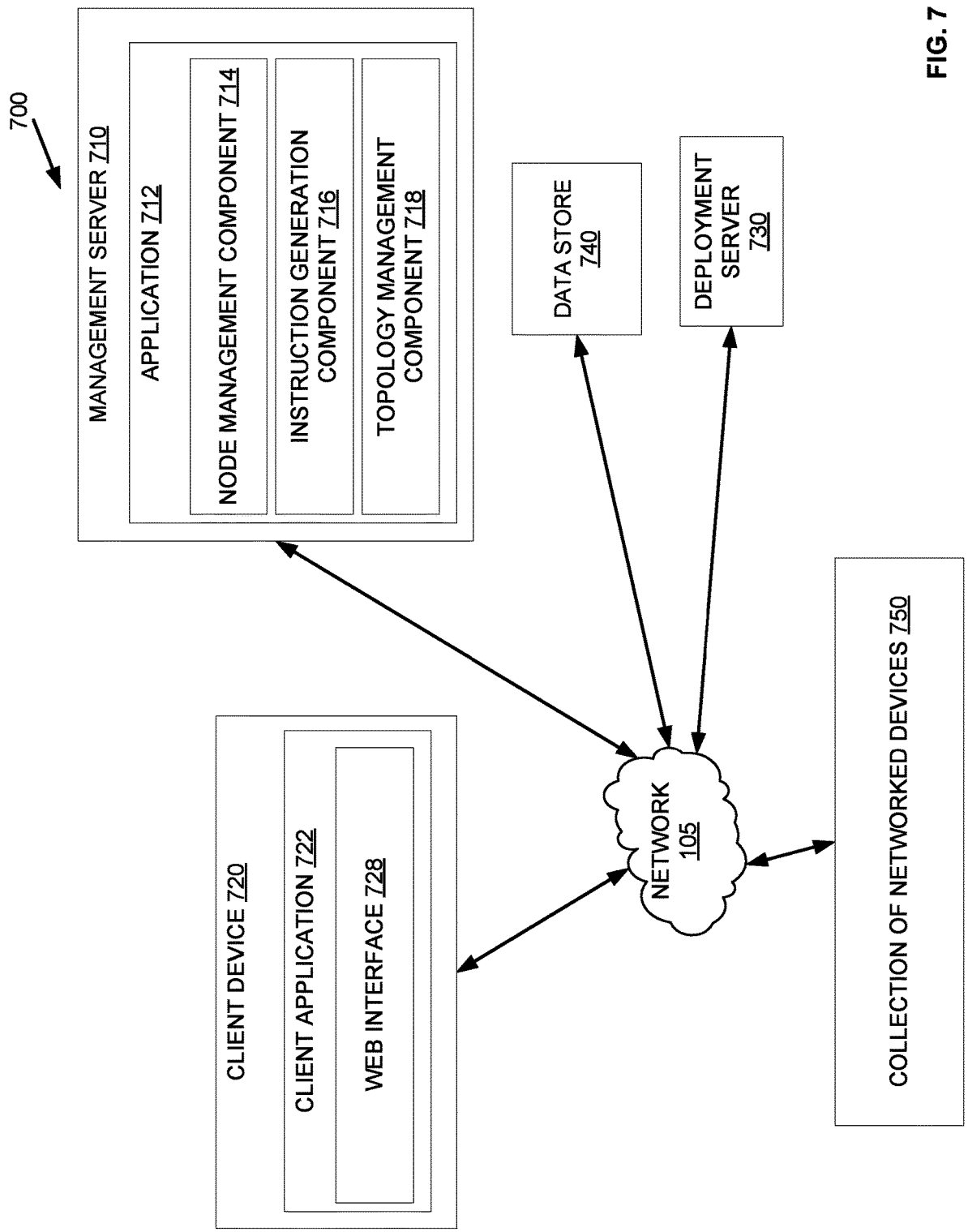
FIG. 7 depicts a block diagram of an example system for performing the method of FIG. 6, in accordance with one or more aspects of the present disclosure.

In an implementation the management server 110 and/or the client device 120 may be configured to determine physical change instructions and configuration change instructions for one or more impacted nodes of a network topology that are changed. FIG. 6 depicts a flow diagram of an example method 600 for a server to generate and provide physical change instructions and configuration change instructions to configure one or more networked devices based upon a requested change to a network topology, in accordance with one or more aspects of the present disclosure. FIG. 7 depicts a block diagram of an example system 700 for performing the method of FIG. 6, in accordance with one or more aspects of the present disclosure. System 700 may be the same or similar to the system architecture 100 and may include one or more processing devices and one or more memory devices. In the example shown, system 700 may include management server 710, client device 720, deployment server 730, data store 740, and collection of networked devices 750. Method 600 of FIG. 6 includes operations performed by management server 710. Also, method 600 may be performed in the same or a similar manner as described above in regards to method 200. Method 600 may be performed by the application 712 executed by one or more processing devices of the management server 710.

At block 605, a processing device may provide a graphical user interface of the network topology for presentation on the client device 720, where the graphical representation comprises a plurality of nodes that represent a plurality of network devices within the network topology. In an implementation, the topology management component 718 may send the graphical user interface to client device 720. Client device 720 may be configured to receive the graphical user interface and display the graphical user interface within web interface 728.

In an implementation, the graphical user interface may be based on topology information received by the topology management component 718 from the deployment server 730. Upon receiving the topology information for the network topology, the node management component 714 may identify and generate a plurality of nodes that represent one or more networked devices within the network topology.

In an implementation, the generated graphical user interface is displayed within the web interface 728 of the client device 720. The web interface 728 may receive user input requesting a change to the network topology. The web interface 728 may send the user input to the topology management component 718.

At block 610, the processing device may receive, via the graphical user interface, the user input requesting a change to the network topology. In an implementation, the topology management component 718 may receive the user input and may send the user input to the node management component 714 to determine impacted nodes.

At block 615, the processing device may determine one or more impacted nodes of the plurality of nodes impacted by the change. In an implementation, the node management component 714 may determine the one or more impacted nodes based upon the user input received. The node management component 714 may determine, for each of the impacted nodes, one or more components to be configured in view of the change and determine new property values for each of the components that may be affected by the change.

At block 620, the processing device may generate physical change instructions and configuration change instructions for the one or more impacted nodes. In an implementation, the instructions generation component 716 may determine which changes to the impacted nodes are changes to physical connectivity and which changes to the impacted nodes are property value changes to configurations of components of the nodes. The physical connectivity changes may be identified and included in the physical change instructions. In an example, the physical change instructions may be formatted as a task list to be provided to a user. In another example, the physical change instructions may be formatted using a markup language and to be provided to the web interface 728 of the client device 720 to be displayed as a notification to the user. The configuration changes may be identified and included in the configuration change instructions.

At block 625, the processing device may cause notification of the physical change instructions to be provided to the user. In an implementation, the topology management component 718 may format and generate a notification message that includes the physical change instructions. The topology management component 718 may send the notification to the client device 720 to notify the user of the physical connectivity changes that need to be performed. In an implementation, the physical change instructions may be sent to one or more client devices used by one or more users. For example, if a team of network engineers are using a group of client devices, then it is beneficial that each of the client devices receive the notification of physical changes to be performed.

At block 630, the processing device may determine whether the physical change instructions have been implemented on the one or more impacted nodes. In an implementation, the topology management component 718 may receive a notification from the user, via the client device 720, indicating that the physical change instructions have been implemented. The topology management component 718 may be configured to verify completion of the physical change instructions by requesting the deployment server 730 to validate that the physical changes have been performed. The deployment server 730 may query the impacted nodes by querying the related networked devices in the collection of networked devices 750 to determine whether the physical connectivity matches the connectivity specified in the physical change instructions. For example, deployment server 730 may connect to the impacted servers and switches to verify connectivity to the desired targets of the impacted servers and switches.

In an implementation, the deployment server 730 may send updated topology information that includes the current connectivity information for the impacted nodes to the management server 710. The topology management component 718 may receive the updated topology information and the node management component 714 may determine whether the physical change instructions have been successfully performed based on the updated topology information.

In another implementation, the topology management component 718 may monitor for updated topology information from the deployment server 730 without having to explicitly request a validation. The deployment server 730 may be configured to monitor the networked devices for changes and send updated topology information to the management server 710. Upon receiving the updated topology information, the node management component 714 may determine whether the physical change instructions have been successfully performed based on the updated topology information.

At block 635, upon determining that the physical change instructions have been implemented, the processing device may provide the configuration change instructions to the deployment server 730 to implement the configuration changes to properties on the impacted nodes. In an implementation, the configuration change instructions generated at block 620 may be stored by the topology management component 718 in the data store 740. The topology management component 718 may access the configuration change instructions from the data store 740 and send the configuration change instructions to the deployment server 730 for implementation.

In an implementation, if the node management component 714 determines that the physical change instructions have not been fully performed then the node management component 718 may determine the outstanding physical changes to be performed. For example, if all but one of the physical changes has been performed, then the remaining physical change may be identified. The instruction generation component 716 may generate second physical change instructions that include any outstanding physical changes to be performed and the topology management component 718 may format and generate a second notification message that includes the outstanding physical changes and may send the second notification to the client device 720. Upon determination that the outstanding physical changes have been performed, the topology management component 718 may send the configuration change instructions to the deployment server 730 for implementation.

Figure 8:
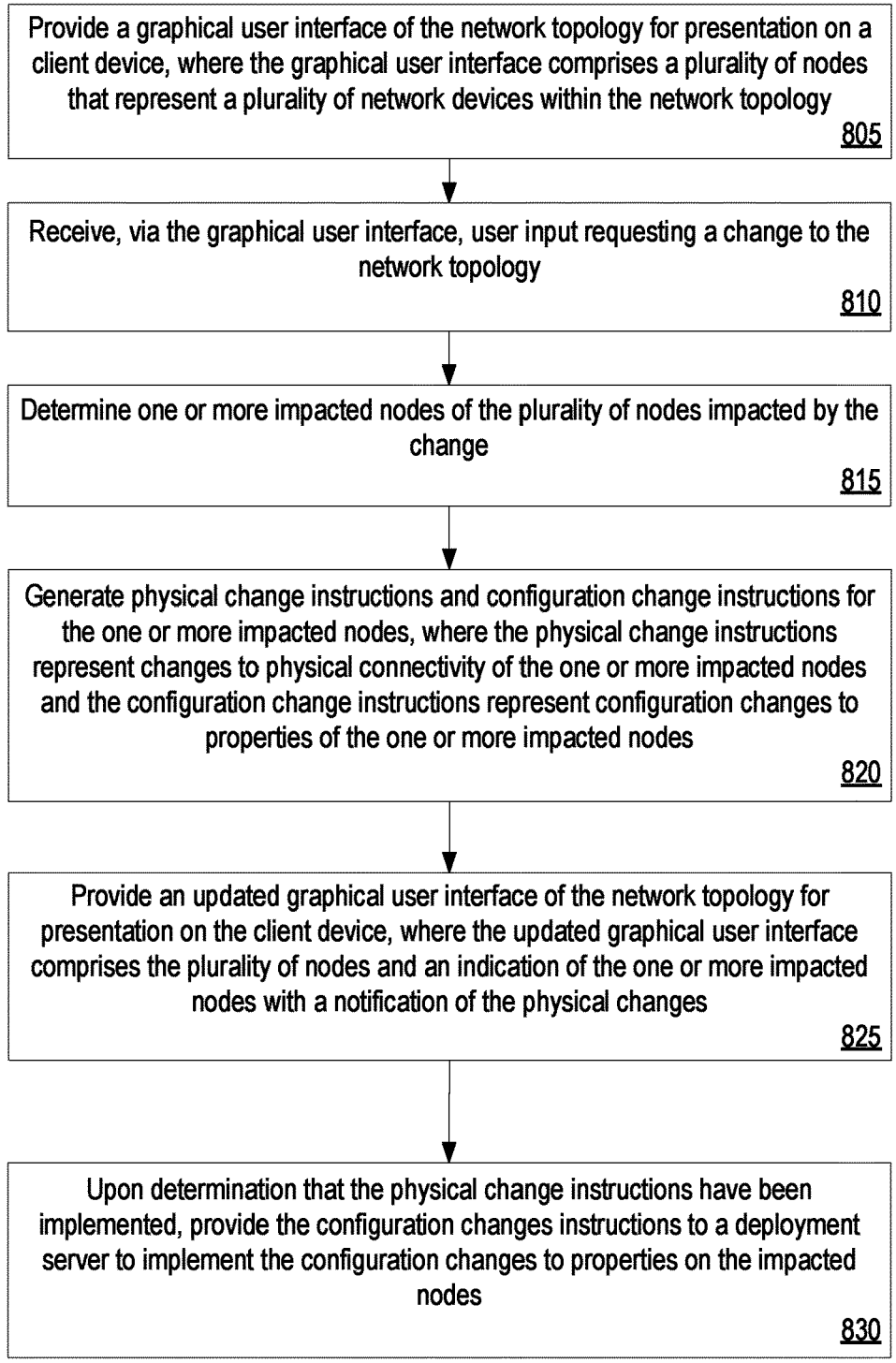
FIG. 8 depicts a flow diagram of an example method for a server to generate and provide physical change instructions and configuration change instructions to configure impacted networked devices based upon a requested change and to provide an updated graphical user interface indicating changes to be performed, in accordance with one or more aspects of the present disclosure.
Figure 9:
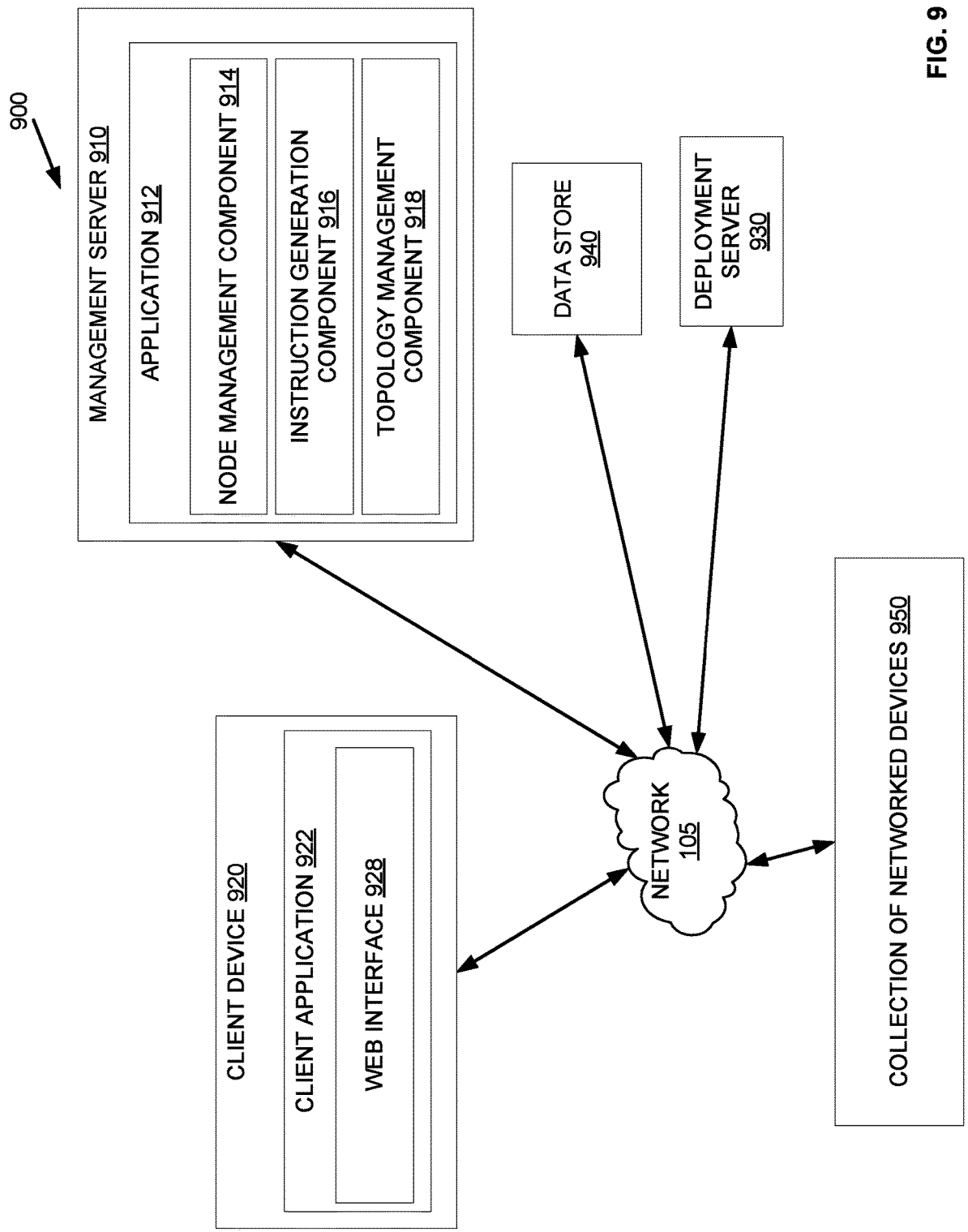
FIG. 9 depicts a block diagram of an example system for performing the method of FIG. 8, in accordance with one or more aspects of the present disclosure.

In an implementation the management server 110 and/or the client device 120 may be configured to determine physical change instructions and configuration change instructions for one or more impacted nodes and may provide an updated graphical user interface of the network topology including notification of physical changes to be performed on impacted nodes. FIG. 8 depicts a flow diagram of an example method 800 for a server to generate and provide physical change instructions and configuration change instructions to configure impacted networked devices based upon a requested change and to provide an updated graphical user interface indicating changes to be performed, in accordance with one or more aspects of the present disclosure. FIG. 9 depicts a block diagram of an example system 900 for performing the method of FIG. 8, in accordance with one or more aspects of the present disclosure. System 900 may be the same or similar to the system architecture 100 and may include one or more processing devices and one or more memory devices. In the example shown, system 900 may include management server 910, client device 920, deployment server 930, data store 940, and collection of networked devices 950. Method 800 of FIG. 8 includes operations performed by management server 910. Also, method 800 may be performed in the same or a similar manner as described above in regards to method 200.

Method 800 may be performed by the application 912 executed by one or more processing devices of the management server 910.

At block 805, a processing device may provide a graphical user interface of the network topology for presentation on the client device 920, where the graphical representation comprises a plurality of nodes that represent a plurality of network devices within the network topology. In an implementation, the topology management component 918 may send the graphical user interface to client device 920. Client device 920 may be configured to receive the graphical user interface and display the graphical user interface within web interface 928.

In an implementation, the graphical user interface may be based on topology information received by the topology management component 918 from the deployment server 930. Upon receiving the topology information for the network topology, the node management component 914 may identify and generate a plurality of nodes that represent one or more networked devices within the network topology. The web interface 928 may receive user input requesting a change to the network topology. The web interface 928 may send the user input to the topology management component 918.

At block 810, the processing device may receive, via the graphical user interface, the user input requesting a change to the network topology. In an implementation, the topology management component 918 may receive the user input and may send the user input to the node management component 914 to determine impacted nodes.

At block 815, the processing device may determine one or more impacted nodes of the plurality of nodes impacted by the change. In an implementation, the node management component 914 may determine, for each of the impacted nodes, one or more components to be configured in view of the change and determine new property values for each of the components that may be affected by the change.

At block 820, the processing device may generate physical change instructions and configuration change instructions for the one or more impacted nodes. In an implementation, the instruction generation component 916 may determine which changes to the impacted nodes are changes to physical connectivity and which changes to the impacted nodes are property value changes to configurations of components of the nodes. The physical connectivity changes may be identified and included in the physical change instructions. The configuration changes may be identified and included in the configuration change instructions.

At block 825, the processing device may provide an updated graphical user interface of the network topology for presentation on the client device 920. The updated graphical user interface may comprise the plurality of nodes and an indication of the one or more impacted nodes with a notification of the physical changes. In an implementation, the node management component 914 may generate an updated graphical user interface that includes the plurality of nodes with the physical changes indicated. The updated graphical user interface may be provided to the client device 920 and displayed within the web interface 928.

In an implementation, the node management component 914 may be configured to indicate, within the updated graphical user interface, the one or more impacted nodes that include physical changes to be performed. For example, the nodes that contain physical changes to be performed may be highlighted or may include icons of a different color to indicate the physical tasks. The impacted nodes that have configuration only changes may be indicated with a color different than nodes that have both physical and configuration changes. These specific indicators may be beneficial to a user for identifying the physical tasks to be implemented.

In an implementation, the updated graphical user interface may include a side-by-side view of the original network topology from the graphical user interface and the updated network topology including physical changes to be performed. This may be beneficial to view changes to nodes as a before and after view. In another implementation, the updated graphical user interface may include an overlay view of the original network topology from the graphical user interface and the updated network topology including the physical changes.

The topology management component 918 may determine that the physical changes have been performed. In an implementation, the deployment server 930 may send updated topology information that includes the current connectivity information for the impacted nodes to the management server 910. The topology management component 918 may receive the updated topology information and the node management component 914 may determine whether the physical change instructions have been successfully performed based on the updated topology information. In another implementation, the topology management component 918 may monitor for updated topology information from the deployment server 930.

At block 830, upon determining that the physical change instructions have been implemented, the processing device may provide the configuration change instructions to the deployment server 930 to implement the configuration changes to properties on the impacted nodes. In an implementation, the configuration change instructions generated at block 820 may have been stored by the topology management component 918 in the data store 940. The topology management component 918 may access the configuration change instructions from the data store 940 and send the configuration change instructions to the deployment server 930 for implementation.

Figure 10:
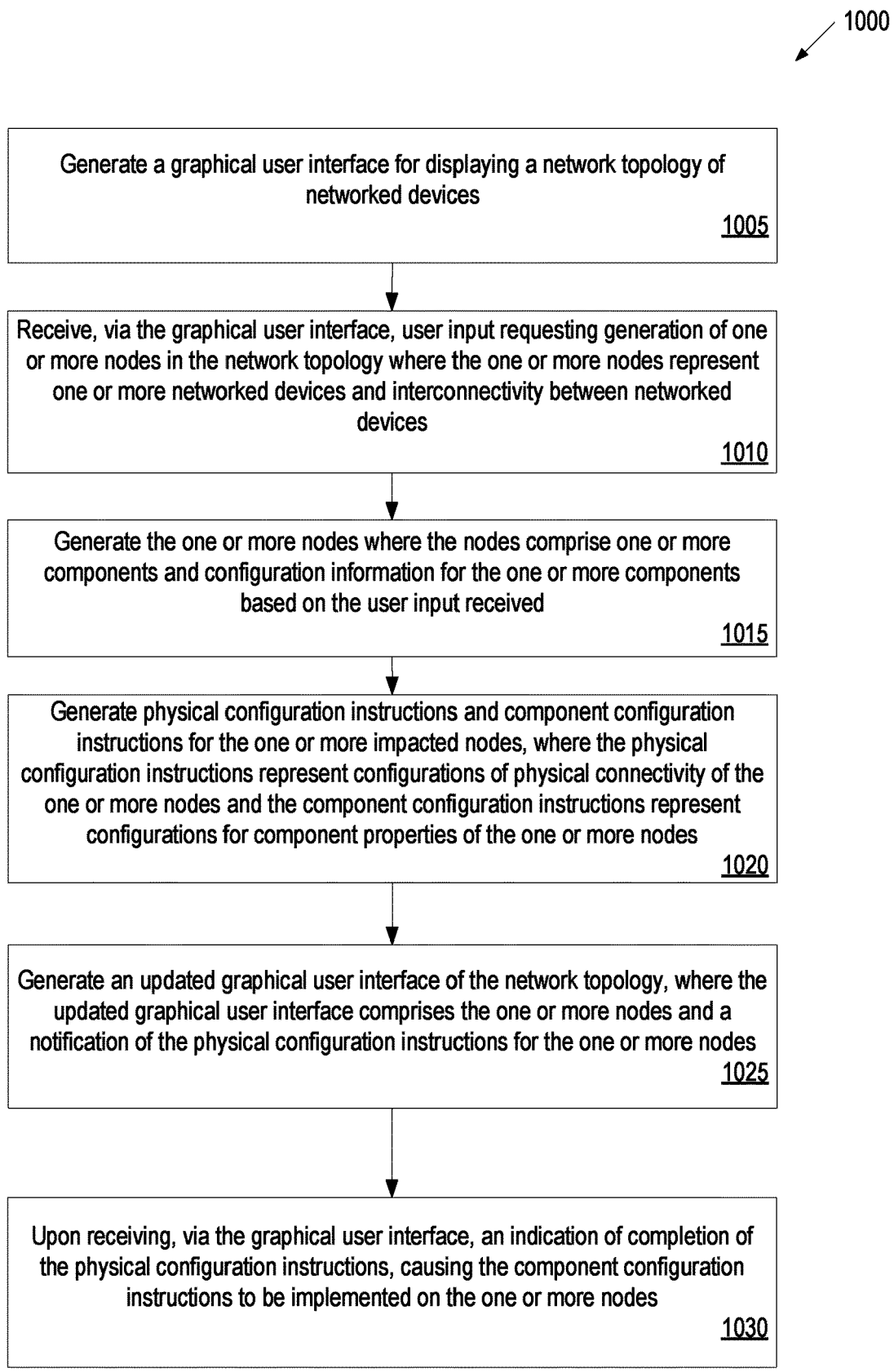
FIG. 10 depicts a flow diagram of an example method for a client device to generate and provide physical change instructions and configuration change instructions to configure networked devices based upon a requested input, in accordance with one or more aspects of the present disclosure.
Figure 11:
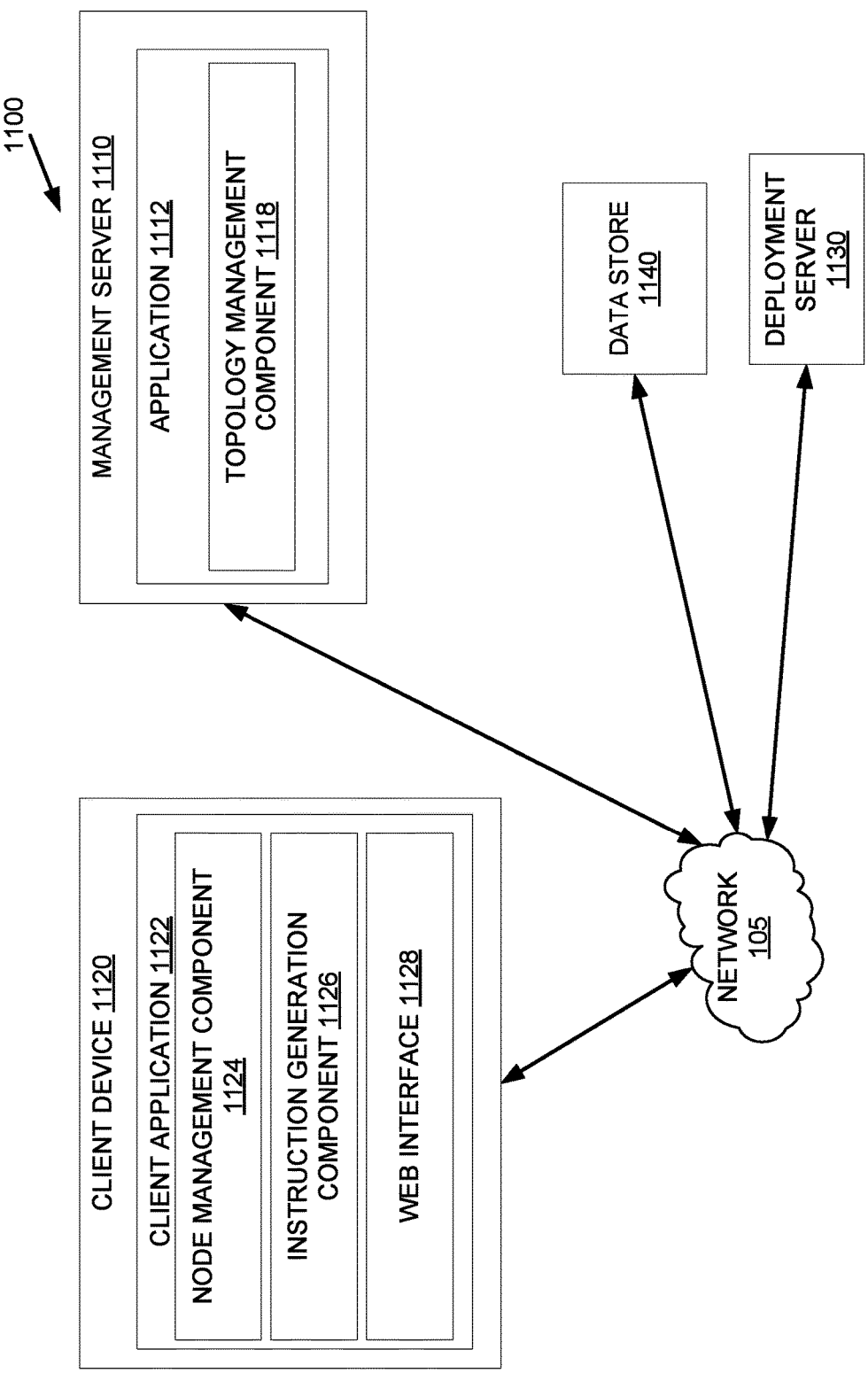
FIG. 11 depicts a block diagram of an example system for performing the method of FIG. 10, in accordance with one or more aspects of the present disclosure

In an implementation, the management server 110 and/or the client device 120 may be configured to generate a new network topology for networked devices. Generation of a network topology may be performed on the management server 110 using application 112 and/or the client device 120 using client application 122. FIG. 10 depicts a flow diagram of an example method 1000 for a client device to generate and provide physical change instructions and configuration change instructions to configure networked devices based upon a requested input, in accordance with one or more aspects of the present disclosure. FIG. 11 depicts a block diagram of an example system 1100 for performing the method of FIG. 10, in accordance with one or more aspects of the present disclosure. System 1100 may be the same or similar to the system architecture 100 and may include one or more processing devices and one or more memory devices. In the example shown, system 1100 may include management server 1110, client device 1120, deployment server 1130, data store 1140, and collection of networked devices 1150. Method 1000 of FIG. 10 includes operations performed by client device 1120. Also, method 1000 may be performed in the same or a similar manner as described above in regards to method 200. Method 1000 may be performed by the client application 1122 executed by one or more processing devices of the client device 1120.

At block 1005, processing device may generate a graphical user interface for displaying a network topology of networked devices. In an implementation, the node management component 1122 may receive configuration information for available networked devices in the collection of networked devices 1150. The configuration information may be received from the management server 1110 and/or the deployment server 1130. The web interface 1128 may display the generated graphical user interface.

At block 1010, processing device may receive, via the graphical user interface, the user input requesting generation of one or more nodes in the network topology. The one or more nodes may represent one or more networked devices from the collection of networked devices 1150 and the user input may include connectivity information for the one or more networked devices. In an implementation, the web interface 1128 may receive the user input and may send the user input to the node management component 1124 to generate the nodes.

At block 1015, the processing device may generate the one or more nodes based on the user input received. In an implementation the node management component 1124 may generate the one or more nodes and each node may comprise one or more components and configuration information for the one or more components. If the user input specifies configuration information for components of each of the nodes, then the node management component 1124 may set the property values of each of the components based on the user input. If however, the user input does not specify each of the property values for the components of each of the nodes, then the node management component 1124 may assign default values for the components. Default values may be null values or other configured values based upon the type of networked device or the network topology. For instance, a specific rack may have default assignment values for switches within the rack.

At block 1020, the processing device may generate physical change instructions and configuration change instructions for the one or more impacted nodes. In an implementation, the instruction generation component 1126 may determine which changes to the impacted nodes are changes to physical connectivity and which changes to the impacted nodes are property value changes to configurations of components of the nodes. The physical connectivity changes may be identified and included in the physical change instructions. The configuration changes may be identified and included in the configuration change instructions.

At block 1025, the processing device may generate an updated graphical user interface of the network topology for presentation on the web interface 1128 of the client device 1120. The updated graphical user interface may comprise the one or more nodes and a notification of the physical changes. In an implementation, the node management component 1124 may generate the updated graphical user interface that includes the one or more nodes with the physical changes indicated.

The node management component 1124 may determine that the physical changes have been performed. In an implementation, the deployment server 1130 may send updated topology information that includes the current connectivity information for the impacted nodes to the management server 1110. The topology management component 1118 may receive the updated topology information and send the information to the node management component 1124 to determine whether the physical change instructions have been successfully performed based on the updated topology information.

At block 1030, the processing device may provide the configuration instructions to the management server 1110 for deployment of the requested change. In an implementation, the instruction generation component 1126 may send the configuration instructions to the topology management component 1118. The topology management component 1118 may be configured to send the configuration instructions to the deployment server 1130. In an implementation, the deployment server 1130 may parse the configuration instructions and may deploy the configuration instructions to each specific networked device.

Figure 13:
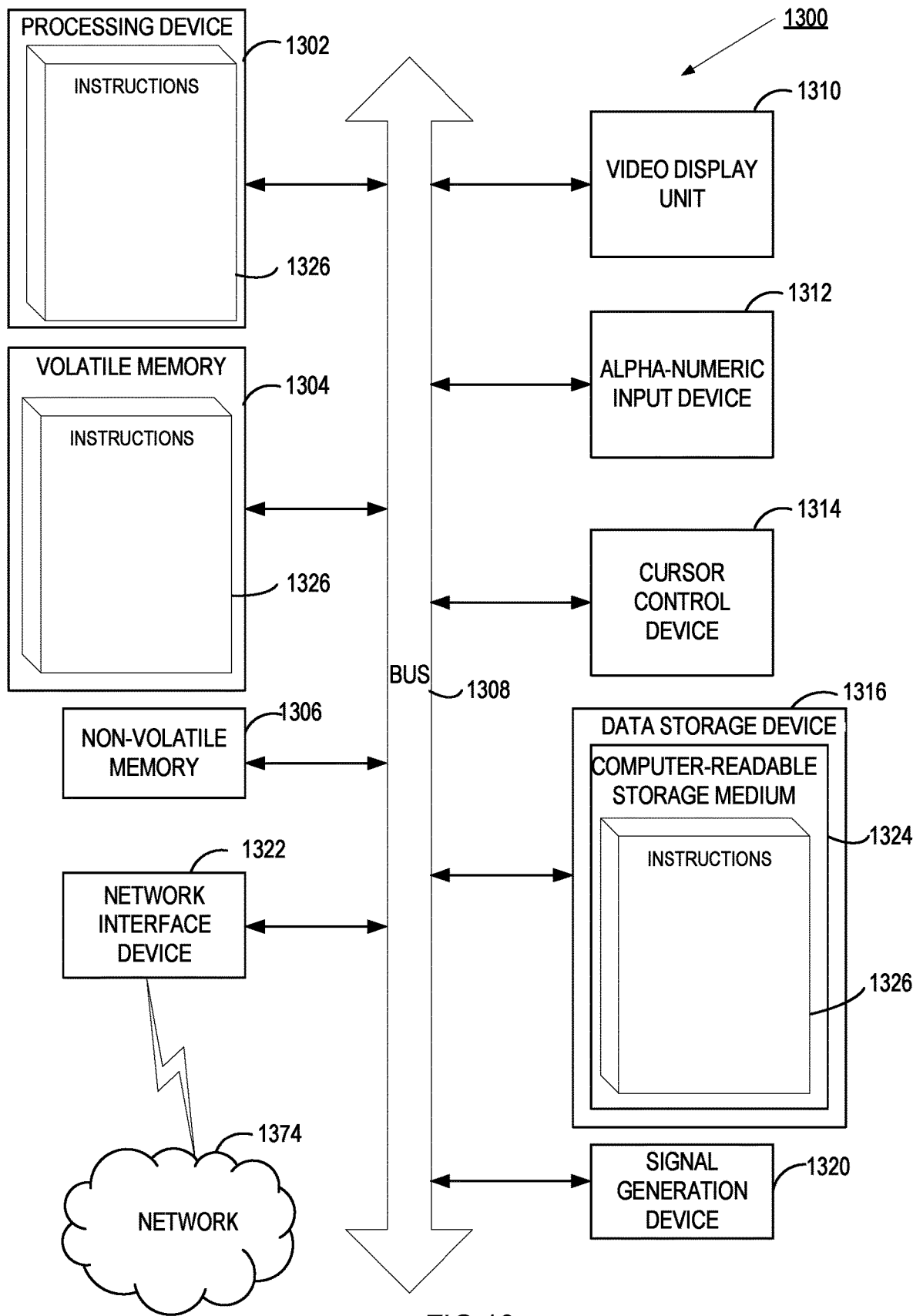
FIG. 13 depicts a block diagram of an illustrative computing device operating in accordance with the examples of the disclosure.

FIG. 13 depicts a block diagram of a computer system operating in accordance with one or more aspects of the disclosure. In various illustrative examples, computer system 1300 may correspond to computing devices, such as client device 120, management server 110, and deployment server 130 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 1300 may be connected (e.g., via a network, such as a Local Area Network (LAN), an intranet, an extranet, or the Internet) to other computer systems. Computer system 1300 may operate in the capacity of a server or a client computer in a client-server environment, or as a peer computer in a peer-to-peer or distributed network environment. Computer system 1300 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1300 may include a processing device 1302, a volatile memory 1304 (e.g., random access memory (RAM)), a non-volatile memory 1306 (e.g., read-only memory (ROM) or electrically-erasable programmable ROM (EEPROM)), and a data storage device 1316, which may communicate with each other via a bus 1308.

Processing device 1302 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1300 may further include a network interface device 1322. Computer system 1300 also may include a video display unit 1310 (e.g., an LCD), an alphanumeric input device 1312 (e.g., a keyboard), a cursor control device 1314 (e.g., a mouse), and a signal generation device 1320.

Data storage device 1316 may include a non-transitory computer-readable storage medium 1324 on which may store instructions 1326 encoding any one or more of the methods or functions described herein, including instructions for application 112 and client application 122 of FIG. 1 for implementing methods 200, 400, 800, and 1000.

Instructions 1326 may also reside, completely or partially, within volatile memory 1304 and/or within processing device 1302 during execution thereof by computer system 1300, hence, volatile memory 1304 and processing device 1302 may also constitute machine-readable storage media.

While computer-readable storage medium 1324 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, 600, 700, 800, and 1000, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: identifying, by a server, a plurality of nodes in a network topology, wherein the plurality of nodes represent one or more networked devices within the network topology; generating a graphical user interface of the network topology, the graphical user interface comprising the plurality of nodes and interconnectivity between each of the plurality of nodes; providing the graphical user interface for presentation on a client device; receiving, via the graphical user interface, user input requesting a change to the network topology; determining one or more impacted nodes of the plurality of nodes impacted by the change; for each of the one or more impacted nodes, determining one or more components to be configured in view of the change; generating configuration instructions to configure the determined one or more components of each impacted node; and providing the configuration instructions to a deployment server to implement the requested change.

Example 2 is the method of Example 1, wherein for each of the one or more impacted nodes, determining the one or more components to be configured in view of the change comprises: determining new property values for components of the one or more impacted nodes based on the change; and for each of the one or more impacted nodes, determining the one or more components to be configured with the new property values in view of the change.

Example 3 is the method of Example 1, wherein the configuration instructions comprise instructions to update properties values for the one or more components of each impacted node of the one or more impacted nodes.

Example 4, is the method of Example 1, wherein the configuration instructions comprise instructions to selectively update properties values for the one or more components of each impacted node of the one or more impacted nodes without updating property values of other components unaffected by the change.

Example 5, is the method of Example 1, further comprising prior to identifying the plurality of nodes in the network topology, receiving topology information for the network topology from the deployment server, wherein the topology information comprises configuration information for the one or more networked devices including property values for components of the one or more networked devices.

Example 6, is the method of Example 1, further comprising: wherein the change to the network topology comprises a request to generate a new node representing one or more new networked devices; generating the new node that represents the one or more new networked devices; wherein determining the one or more impacted nodes of the plurality of nodes impacted by the change comprises determining the one or more impacted nodes that are impacted by generation of the new node; wherein generating the configuration instructions to configure the determined one or more components of each impacted node comprises: generating instructions to configure components of the new node; generating instructions to configure the determined one or more components of each impacted node; and generating the configuration instructions comprising the instructions to configure components of the new node and the instructions to configure the determined one or more components of each impacted node.

Example 7, is the method of Example 1, further comprising: receiving updated topology information for the network topology from the deployment server, wherein the updated topology information includes changes to the one or more impacted nodes; generating an updated graphical user interface of the network topology, the updated graphical user interface comprising the plurality of nodes including the changes to the one or more impacted nodes; and providing the updated graphical user interface for presentation on the client device.

Example 8 is a method comprising: receiving, by a client device, topology information for a network topology; determining a plurality of nodes in the network topology, wherein the plurality of nodes represent one or more networked devices within the network topology; generating a graphical user interface of the network topology, the graphical user interface comprising the plurality of nodes and interconnectivity between each of the plurality of nodes; displaying the graphical user interface on the client device; receiving, via the graphical user interface, user input requesting a change to the network topology; determining one or more impacted nodes of the plurality of nodes impacted by the change; for each of the one or more impacted nodes, determining one or more components to be configured in view of the change; generating configuration instructions to configure the determined one or more components of each impacted node; and providing the configuration instructions to a management server for deployment of the requested change.

Example 9 is the method of Example 8, wherein for each of the one or more impacted nodes, determining the one or more components to be configured in view of the change comprises: determining new property values for components of the one or more impacted nodes based on the change; and for each of the one or more impacted nodes, determining the one or more components to be configured with the new property values in view of the change.

Example 10 is the method of Example 8, wherein the configuration instructions comprise instructions to update properties values for the one or more components of each impacted node of the one or more impacted nodes.

Example 11 is the method of Example 8, wherein the configuration instructions comprise instructions to selectively update properties values for the one or more components of each impacted node of the one or more impacted nodes without updating property values of other components unaffected by the change.

Example 12 is the method of Example 8, further comprising: wherein the change to the network topology comprises a request to generate a new node representing one or more new networked devices; generating the new node that represents the one or more new networked devices; wherein determining the one or more impacted nodes of the plurality of nodes impacted by the change comprises determining the one or more impacted nodes that are impacted by generation of the new node; wherein generating the configuration instructions to configure the determined one or more components of each impacted node comprises: generating instructions to configure components of the new node; generating instructions to configure the determined one or more components of each impacted node; and generating the configuration instructions comprising the instructions to configure components of the new node and the instructions to configure the determined one or more components of each impacted node.

Example 13 is the method of Example 8, further comprising: receiving updated topology information for the network topology from the management server, wherein the updated topology information includes changes to the one or more impacted nodes; generating an updated graphical user interface of the network topology, the updated graphical user interface comprising the plurality of nodes including the changes to the one or more impacted nodes; and displaying the updated graphical user interface on the client device.

Example 14 is the method of Example 13, wherein displaying the updated graphical user interface on the client device comprises displaying the updated graphical user interface comprising the plurality of nodes, interconnectivity between each of the plurality of nodes, and an indication of the one or more impacted nodes of the plurality of nodes that were updated based on the change.

Example 15 is the method of Example 13, wherein displaying the updated graphical user interface on the client device comprises displaying a side-by-side view of the graphical user interface and the updated graphical user interface.

Example 16 is the method of Example 13, wherein displaying the updated graphical user interface on the client device comprises displaying an overlay view of the graphical user interface and the updated graphical user interface, wherein the one or more impacted nodes of the plurality of nodes are highlighted to indicate updates based on the change.

Example 17 is a method comprising: providing a graphical user interface of a network topology for presentation on a client device, the graphical user interface comprising a plurality of nodes that represent a plurality of networked devices within the network topology; receiving, via the graphical user interface, user input requesting a change to the network topology; determining one or more impacted nodes of the plurality of nodes impacted by the change; generating physical change instructions and configuration change instructions for the one or more impacted nodes, wherein the physical change instructions represent changes to physical connectivity of the one or more impacted nodes and the configuration change instructions represent configuration changes to properties of the one or more impacted nodes; causing a notification of the physical change instructions to be provided to a user; determining whether the physical change instructions have been implemented on the one or more impacted nodes; and upon determining that the physical change instructions have been implemented on the one or more impacted nodes, providing the configuration change instructions to a deployment server to implement the configuration changes to properties of the one or more impacted nodes.

Example 18 is the method of Example 17, further comprising: prior to providing the graphical user interface of the network topology for presentation on the client device, receiving topology information for the network topology from the deployment server, wherein the topology information comprises configuration information for the one or more networked devices; identifying the plurality of nodes in the network topology, wherein the plurality of nodes represent the one or more networked devices within the network topology; and generating the graphical user interface of the network topology.

Example 19 is the method of Example 17, wherein determining the one or more impacted nodes of the plurality of nodes impacted by the change comprises: determining the one or more impacted nodes based on the change; and for each of the one or more impacted nodes, determining one or more components to be configured in view of the change, wherein the one or more components contain property values to be updated based on the change.

Example 20 is the method of Example 17, wherein causing the notification of the physical change instructions to be provided to the user comprises: generating a notification message comprising the physical change instructions; and sending the notification message to one or more client devices associated with the user.

Example 21 is the method of Example 17, wherein determining whether the physical change instructions have been implemented on the one or more impacted nodes comprises: receiving updated topology information for the network topology from the deployment server; and determining whether the physical change instructions have been implemented on the one or more impacted nodes based upon the updated topology information.

Example 22 is the method of Example 17, wherein determining whether the physical change instructions have been implemented on the one or more impacted nodes comprises: receiving a request to validate whether the physical change instructions have been implemented on the one or more impacted nodes from the client device; sending the request to validate the physical change instructions to the deployment server; receiving updated topology information for the network topology from the deployment server; and determining whether the physical change instructions have been implemented on the one or more impacted nodes based upon the updated topology information.

Example 23 is the method of Example 17, further comprising: upon determining that the physical change instructions have not been implemented on the one or more impacted nodes, determining outstanding physical changes to physical connectivity to one or more remaining impacted nodes of the one or more impacted nodes that require changes; generating second physical change instructions that represent the outstanding physical changes; and causing a second notification of the second physical change instructions to be provided to the user.

Example 24 is a method comprising: providing a graphical user interface of a network topology for presentation on a client device, the graphical user interface comprising a plurality of nodes that represent a plurality of networked devices within the network topology; receiving, via the graphical user interface, user input requesting a change to the network topology; determining one or more impacted nodes of the plurality of nodes impacted by the change; generating physical change instructions and configuration change instructions for the one or more impacted nodes, wherein the physical change instructions represent changes to physical connectivity of the one or more impacted nodes and the configuration change instructions represent configuration changes to properties of the one or more impacted nodes; providing an updated graphical user interface of the network topology for presentation on the client device, the updated graphical user interface comprising the plurality of nodes and an indication of the one or more impacted nodes with a notification of the physical change instructions; and upon receiving, via the updated graphical user interface, an indication of completion of the physical change instructions, causing the configuration change instructions to be implemented on the one or more impacted nodes.

Example 25 is the method of Example 24, further comprising: prior to providing the graphical user interface of the network topology for presentation on the client device, receiving topology information for the network topology from a deployment server, wherein the topology information comprises configuration information for the one or more networked devices; identifying the plurality of nodes in the network topology, wherein the plurality of nodes represent the one or more networked devices within the network topology; and generating the graphical user interface of the network topology.

Example 26 is the method of Example 24, wherein determining the one or more impacted nodes of the plurality of nodes impacted by the change comprises: determining the one or more impacted nodes based on the change; and for each of the one or more impacted nodes, determining one or more components to be configured in view of the change, wherein the one or more components contain property values to be updated based on the change.

Example 27 is the method of Example 24, wherein providing the updated graphical user interface for presentation on the client device comprises providing a side-by-side view of the graphical user interface and the updated graphical user interface.

Example 28 is the method of Example 24, wherein providing the updated graphical user interface for presentation on the client device comprises providing an overlay view of the graphical user interface and the updated graphical user interface, wherein the one or more impacted nodes of the plurality of nodes are highlighted to indicate updates based on the change.

Example 29 is the method of Example 24, wherein receiving the indication of completion of the physical change instructions comprises: receiving updated topology information for the network topology from the deployment server; and determining the physical change instructions have been implemented on the one or more impacted nodes based upon the updated topology information.

Example 30 is the method of Example 24, wherein receiving the indication of completion of the physical change instructions comprises: receiving a request to validate whether the physical change instructions have been implemented on the one or more impacted nodes from the client device; sending the request to validate the physical change instructions to the deployment server; receiving updated topology information for the network topology from the deployment server; and determining the physical change instructions have been implemented on the one or more impacted nodes based upon the updated topology information.

Example 31 is the method of Example 24, wherein causing the configuration instructions to be implemented on the one or more impacted nodes comprises providing the configuration instructions to a deployment server to implement the changes to the properties of the one or more impacted nodes.

Example 32 is a method comprising: generating, by a client device, a graphical user interface for displaying a network topology of networked devices; receiving, via the graphical user interface, user input requesting generation of one or more nodes in the network topology, the one or more nodes representing one or more networked devices and interconnectivity between the one or more networked devices; generating the one or more nodes in the network topology, wherein each node of the one or more nodes comprises one or more components and configuration information for the one or more components, wherein the configuration information for the one or more components is based upon the user input received; generating physical configuration instructions and component configuration instructions for the one or more nodes, wherein the physical configuration instructions represent configurations of physical connectivity of the one or more nodes and the component configuration instructions represent configurations for component properties of the one or more nodes; generating an updated graphical user interface of the network topology, the updated graphical user interface comprising the one or more nodes and a notification of the physical configuration instructions for the one or more nodes; and upon receiving, via the updated graphical user interface, an indication of completion of the physical configuration instructions, causing the component configuration instructions to be implemented on the one or more nodes.

Example 33 is the method of Example 32, further comprising receiving configuration information for the networked devices.

Example 34 is the method of Example 32, wherein the configuration information for the one or more components represents property values for desired configuration of the one or more components based upon the user input received.

Example 35 is the method of Example 32, wherein receiving the indication of completion of the physical configuration instructions comprises: receiving updated topology information for the network topology from a deployment server; and determining the physical configuration instructions have been implemented on the one or more nodes based upon the updated topology information.

Example 36 is the method of Example 32, wherein receiving the indication of completion of the physical configuration instructions comprises: receiving a request to validate whether the physical configuration instructions have been implemented on the one or more nodes from the client device; sending the request to validate the physical configuration instructions to the deployment server; receiving updated topology information for the network topology from the deployment server; and determining the physical configuration instructions have been implemented on the one or more nodes based upon the updated topology information.

Example 37 is the method of Example 32, wherein causing the component configuration instructions to be implemented on the one or more nodes comprises providing the component configuration instructions to a deployment server to implement the configurations for the component properties of the one or more nodes.

What is claimed is:

1. A method comprising:
providing, by a processing device, a graphical user interface comprising a plurality of nodes associated with a network;
receiving, via the graphical user interface, user input requesting a change to at least one of the plurality of nodes or to the network;
determining one or more impacted nodes of the plurality of nodes impacted by the change;
generating a physical change instruction and a configuration instruction for the one or more impacted nodes, wherein the physical change instruction represents a change to physical connectivity of one of the one or more impacted nodes and the configuration instruction represents a change of a configuration value of one of the one or more impacted nodes; and
upon determining that the physical change instruction has been implemented on the one or more impacted nodes, initiating, by the processing device, the configuration instruction to change the configuration value.

2. The method of claim 1, wherein the plurality of nodes comprises a plurality of servers and wherein generating the configuration instruction comprises:
determining a new property value for a component of one or more impacted servers based on the requested change; and
determining one or more of the impacted servers to be configured with the new property value.

3. The method of claim 1, wherein the configuration instruction comprises an instruction to update a property value for an impacted node of the one or more impacted nodes.

4. The method of claim 1, wherein the configuration instruction comprises an instruction to update a property value of a component of an impacted node without updating a property value of another component of the impacted node.

5. The method of claim 1, further comprising:
receiving topology information for a network topology of the network, wherein the topology information comprises configuration information for one or more networked devices and the configuration information comprises a plurality of property values for components of the one or more networked devices; and
identifying the plurality of nodes in the network topology, wherein the plurality of nodes represent one or more devices in the network topology.

6. The method of claim 2, further comprising:
adding a new server to the plurality of servers associated with the network; and
identifying the one or more impacted servers based on servers impacted by the adding of the new server.

7. The method of claim 5, further comprising:
receiving updated topology information for the network topology, wherein the updated topology information comprises a change to the one or more impacted nodes;
generating an updated graphical user interface, wherein the updated graphical user interface comprising the plurality of nodes and represents the change to the at least one of the plurality of nodes; and
providing the updated graphical user interface for presentation on a client device.

8. A system comprising:
a memory; and
a processing device operatively coupled with the memory to:
provide a graphical user interface comprising a plurality of nodes associated with a network;
receive, via the graphical user interface, user input requesting a change to at least one of the plurality of nodes or to the network;
determine one or more impacted nodes of the plurality of nodes impacted by the change;
generate a physical change instruction and a configuration change instruction for the one or more impacted nodes, wherein the physical change instruction represents a change to physical connectivity of one of the one or more impacted nodes and the configuration change instruction represents a change to a configuration value of one of the one or more impacted nodes; and upon determining that the physical change instruction has been implemented on the one or more impacted nodes, initiate the configuration change instruction to change the configuration value.

9. The system of claim 8, wherein the processing device further to:
receive topology information for a network topology of the network, wherein the topology information comprises configuration information for one or more networked devices;
identify the plurality of nodes in view of the network topology; and
generate the graphical user interface in view of the network topology.

10. The system of claim 8, wherein the impacted nodes comprise a plurality of impacted servers and to determine the one or more impacted nodes, the processing device is to:
determine the one or more impacted servers based on the requested change; and
determine a component of the one or more impacted servers that is to be configured, wherein the component comprises a property value to be updated based on the requested change.

11. The system of claim 8, wherein the processing device is further to cause a notification of the physical change instruction to be provided to a user, wherein to cause, the processing device is to:
generate a notification message comprising the physical change instruction; and
send the notification message to one or more client devices associated with the user.

12. The system of claim 8, wherein to determine that the physical change instruction has been implemented, the processing device is to:
receive information from a deployment server; and
determine whether the physical change instruction has been implemented on the one or more impacted nodes based on the information.

13. The system of claim 8, wherein to determine that the physical change instruction has been implemented, the processing device is to:
receive a request to validate whether the physical change instruction has been implemented on the one or more impacted nodes from a client device;
send the request to validate the physical change instruction to a deployment server;
receive updated information from the deployment server; and
determine whether the physical change instruction has been implemented on the one or more impacted nodes based upon the updated information.

14. The system of claim 8, wherein the processing device further to:
determine an outstanding physical change to physical connectivity to one or more remaining impacted nodes of the one or more impacted nodes that require changes;
generate second physical change instruction that represents the outstanding physical change; and
cause a second notification of the second physical change instruction to be provided to a user.

15. A tangible non-transitory computer-readable media storing instructions that, when executed, cause one or more processing devices to:
provide a graphical user interface comprising a plurality of nodes associated with a network;
receive, via the graphical user interface, user input requesting a change to at least one of the plurality of nodes or to the network;
determine one or more impacted nodes of the plurality of nodes impacted by the change;
generate a physical change instruction and a configuration change instruction for the one or more impacted nodes, wherein the physical change instruction represents a change to physical connectivity of one of the one or more impacted nodes and the configuration change instruction represents a change to a configuration value of one of the one or more impacted nodes; and
upon receiving an indication of completion of the physical change instruction, cause the configuration change instruction to be implemented on the one or more impacted nodes.

16. The computer-readable media of claim 15, wherein the one or more processing devices are further to:
receive topology information for a network topology of the network from a deployment server, wherein the topology information comprises configuration information for one or more networked devices;
identify the plurality of nodes in the network topology, wherein the plurality of nodes represent one or more of the plurality of networked devices of the network topology; and
generate the graphical user interface of the network topology.

17. The computer-readable media of claim 15, wherein the one or more impacted nodes comprise one or more impacted servers and to determine the one or more impacted nodes, the processing devices are to:
determine the one or more impacted servers based on the requested change; and
determine a component of the one or more impacted servers to be configured in view of the requested change, wherein the component comprises a property value to be updated based on the requested change.

18. The computer-readable media of claim 15, wherein the processing devices are to provide an updated graphical user interface, wherein the graphical user interface and the updated graphical user interface are displayed side-by-side.

19. The computer-readable media of claim 15, wherein the processing devices are to provide an overlay view of the graphical user interface and an updated graphical user interface, wherein the one or more impacted nodes are highlighted to indicate updates based on the requested change.

20. The computer-readable media of claim 15, wherein to receive the indication of completion of the physical change instruction, the processing devices are to:
receive updated information from a deployment server; and
determine the physical change instruction has been implemented on the one or more impacted nodes based upon the updated information.

* * * * *